US012693229B2

(12) United States Patent
Sangu et al.

(10) Patent No.: US 12,693,229 B2
(45) Date of Patent: Jul. 28, 2026

(54) INSPECTION APPARATUS

(71) Applicant: Samsung Display Co., LTD., Yongin-si (KR)

(72) Inventors: Akifumi Sangu, Yongin-si (KR); Se-Kwang Han, Yongin-si (KR); Hyeran Ko, Yongin-si (KR); Jaemin Son, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 436 days.

(21) Appl. No.: 18/389,522

(22) Filed: Nov. 14, 2023

(65) Prior Publication Data

US 2024/0255437 A1 Aug. 1, 2024

(30) Foreign Application Priority Data

Feb. 1, 2023 (KR) ........................ 10-2023-0013793

(51) Int. Cl.
*G01N 21/88* (2006.01)
*G01N 21/94* (2006.01)

(52) U.S. Cl.
CPC ......... *G01N 21/8806* (2013.01); *G01N 21/94* (2013.01)

(58) Field of Classification Search
CPC .. G01N 21/8806; G01N 21/94; G01N 21/956; G01N 21/01; G01N 2021/0112; G01N 2021/8809; G01N 2021/8816; G01N 2021/9513; G01R 31/308
See application file for complete search history.

(56) References Cited

U.S. PATENT DOCUMENTS

| | | | |
|---|---|---|---|
| 7,391,510 B2 | 6/2008 | Ben-Tulila et al. | |
| 7,852,564 B2 * | 12/2010 | Messina | G02B 19/0066 |
| | | | 362/346 |
| 8,462,328 B2 | 6/2013 | Fisch et al. | |
| 10,690,600 B1 * | 6/2020 | Peidous | G01N 21/956 |
| 2009/0003810 A1 * | 1/2009 | Dunn | H04N 23/56 |
| | | | 362/11 |
| 2013/0147943 A1 | 6/2013 | Katzir et al. | |
| 2020/0049555 A1 * | 2/2020 | Goldring | G01J 3/0291 |

(Continued)

FOREIGN PATENT DOCUMENTS

| | | | |
|---|---|---|---|
| KR | 1020110043616 A | 4/2011 |
| KR | 101520636 B1 | 5/2015 |

(Continued)

*Primary Examiner* — Francis C Gray
(74) *Attorney, Agent, or Firm* — CANTOR COLBURN LLP

(57) ABSTRACT

An inspection apparatus includes a light source which radiates a beam, a first lens disposed between the inspection object and the light source with a first opening defined therethrough in a first direction, a second lens disposed between the inspection object and the first lens with a second opening defined therethrough in the first direction to overlap the first opening, an inspection unit disposed to be spaced apart from the inspection object with the first lens interposed therebetween and including an incidence portion disposed to overlap the first opening and the second opening on a plane, and a driving unit which adjusts a distance between the first lens and the inspection object or a distance between the second lens and the inspection object.

20 Claims, 21 Drawing Sheets

(56) References Cited

U.S. PATENT DOCUMENTS

| | | | | |
|---|---|---|---|---|
| 2020/0279090 A1* | 9/2020 | He | ..................... | G06V 40/1318 |
| 2022/0155574 A1 | 5/2022 | Fisch et al. | | |
| 2024/0192142 A1* | 6/2024 | Hwang | .............. | G01N 21/8806 |

FOREIGN PATENT DOCUMENTS

| | | | |
|---|---|---|---|
| KR | 101832526 | B1 | 4/2018 |
| KR | 1020220031684 | A | 3/2020 |
| KR | 102373287 | B1 | 3/2022 |

* cited by examiner

FIG. 4B

INSPECTION APPARATUS

This application claims priority to Korean Patent Application No. 10-2023-0013793, filed on Feb. 1, 2023, and all the benefits accruing therefrom under 35 U.S.C. § 119, the content of which in its entirety is herein incorporated by reference.

BACKGROUND

1. Field

The disclosure herein relates to an inspection apparatus, and more particularly, to an inspection apparatus with improved visibility of a defect in an inspection object.

2. Description of the Related Art

Various inspection apparatuses may be used to inspect a display device. Among them, an optical inspection apparatus may inspect the display device by using a camera. The optical inspection apparatus may easily inspect the display device for defects such as foreign substances or film residues.

SUMMARY

The disclosure provides an inspection apparatus with improved reliability of defect determination.

An embodiment of the invention provides an inspection apparatus including: a light source disposed to be spaced apart from an inspection object in a first direction, where the light source radiates a beam: a first lens disposed between the inspection object and the light source, where the first lens is provided with a first opening defined therethrough in the first direction; a second lens disposed between the inspection object and the first lens, where the second lens is provided with a second opening defined therethrough in the first direction to overlap the first opening: an inspection unit disposed to be spaced apart from the inspection object with the first lens interposed therebetween, where the inspection unit includes an incidence portion disposed to overlap the first opening and the second opening on a plane; and a driving unit which adjusts a first distance between the first lens and the inspection object or a second distance between the second lens and the inspection object.

In an embodiment, at least one selected from the first lens and the second lens may include a convex lens.

In an embodiment, at least one selected from the first lens and the second lens may include an aspherical lens.

In an embodiment, at least one selected from the first lens and the second lens may include a Fresnel lens.

In an embodiment, at least one selected from the first lens and the second lens may include: a plurality of first sub-lenses disposed along a periphery of the first opening or the second opening and each having a first radius of curvature; and a plurality of second sub-lenses disposed alternately with the plurality of first sub-lenses along the periphery of the first opening or the second opening and each having a second radius of curvature.

In an embodiment, a radius of the first opening may be smaller than or equal to a radius of the second opening.

In an embodiment, the light source may be provided in plurality, and a plurality of light sources may include: a plurality of first light sources arranged to be spaced apart from a center of the first opening by a first separation distance; and a plurality of second light sources arranged to be spaced apart from the center of the first opening by a second separation distance, where the first separation distance and the second separation distance may be greater than a radius of the first opening.

In an embodiment, the first separation distance and the second separation distance may be the same as each other, and the first light sources and the second light sources may be alternately arranged with each other.

In an embodiment, the second separation distance may be greater than the first separation distance.

In an embodiment, the first light sources and the second light sources may be disposed to be aligned with each other when viewed from the center of the first opening.

In an embodiment, the inspection apparatus may further include a control unit which controls an operation of the plurality of light sources, wherein the control unit may adjust an emission angle of the beam or control a switch-on or switch-off operation of the plurality of light sources.

In an embodiment of the invention, an inspection apparatus includes: a light source disposed to be spaced apart from an inspection object in a first direction, where the light source radiates a beam: a first lens disposed between the inspection object and the light source, where the first lens is provided with a first opening defined therethrough in the first direction: a second lens disposed between the inspection object and the first lens, where the second lens is provided with a second opening defined therethrough in the first direction to overlap the first opening; and an inspection unit disposed to be spaced apart from the inspection object with the first lens interposed therebetween, where the inspection unit includes an incidence portion disposed to overlap the first opening and the second opening on a plane, where at least one selected from the first lens and the second lens may include: a plurality of first sub-lenses disposed along a periphery of the first opening or the second opening and each having a first radius of curvature; and a plurality of second sub-lenses disposed alternately with the first sub-lenses along the periphery of the first opening or the second opening and each having a second radius of curvature.

In an embodiment, the first sub-lenses of the first lens may overlap the first sub-lenses of the second lens of the second lens, and the second sub-lenses of the first lens overlap the second sub-lenses of the second lens, or the first sub-lenses of the first lens overlap the second sub-lenses of the second lens of the second lens, and the second sub-lenses of the first lens overlap the first sub-lenses of the second lens.

In an embodiment, the first radius of curvature and the second radius of curvature may be different from each other.

In an embodiment, the light source may be provided in plurality, and a plurality of light sources may overlap one of the first sub-lenses or the second sub-lenses.

In an embodiment, a radius of the first opening may be smaller than or equal to a radius of the second opening.

In an embodiment, the inspection apparatus may further include a driving unit which rotates at least one selected from the first lens and the second lens around an axis in the first direction.

In an embodiment, the driving unit may adjust a first distance between the first lens and the inspection object or a second distance between the second lens and the inspection object.

In an embodiment, the light source may be provided in plurality, and a plurality of light sources may include: a plurality of first light sources arranged to be spaced apart from a center of the first opening by a first separation distance; and a plurality of second light sources arranged to be spaced apart from the center of the first opening by a second separation distance, wherein the first separation distance and the second separation distance may be greater than a radius of the first opening.

In an embodiment, the first light sources and the second light sources may be disposed to be aligned with each other when viewed from the center of the first opening.

BRIEF DESCRIPTION OF THE DRAWINGS

The above and other features of the invention will become more apparent by describing in further detail embodiments thereof with reference to the accompanying drawings, in which:

FIG. 4B is a front view of the inspection apparatus according to an embodiment of the invention;

DETAILED DESCRIPTION

Figure 1:
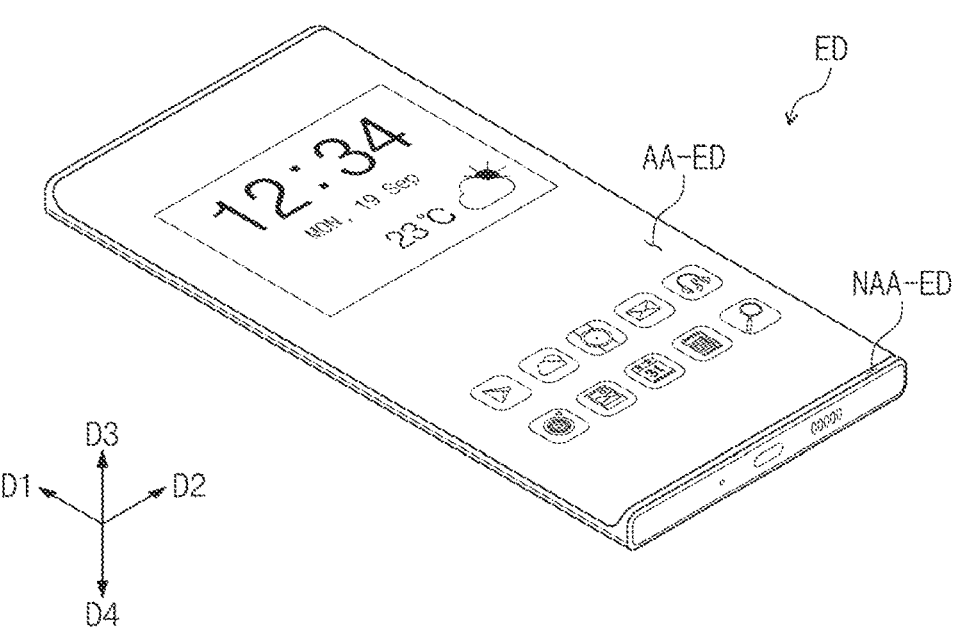
FIG. 1 is a combined perspective view of an electronic device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, it will be understood that when an element (or region, layer, portion, etc.) is referred to as being "on", "connected to" or "coupled to" another element, it can be directly on, connected or coupled to the other element, or intervening elements may be present.

Like reference numerals refer to like elements throughout. In addition, in the drawings, the thicknesses, ratios, and dimensions of elements are exaggerated for effective description of the technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. For example, a first element could be termed a second element without departing from the scope of the invention. Similarly, the second element may also be referred to as the first element. The terms of a singular form include a plural form unless otherwise specified.

Terms, such as "below", "lower", "above", "upper" and the like, are used herein for ease of description to describe one element's relation to another element(s) as illustrated in the figures. The above terms are relative concepts and are described based on the directions indicated in the drawings.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display panel and a method of manufacturing the display panel according to embodiments of the invention will be described with reference to the accompanying drawings.

Figure 2:
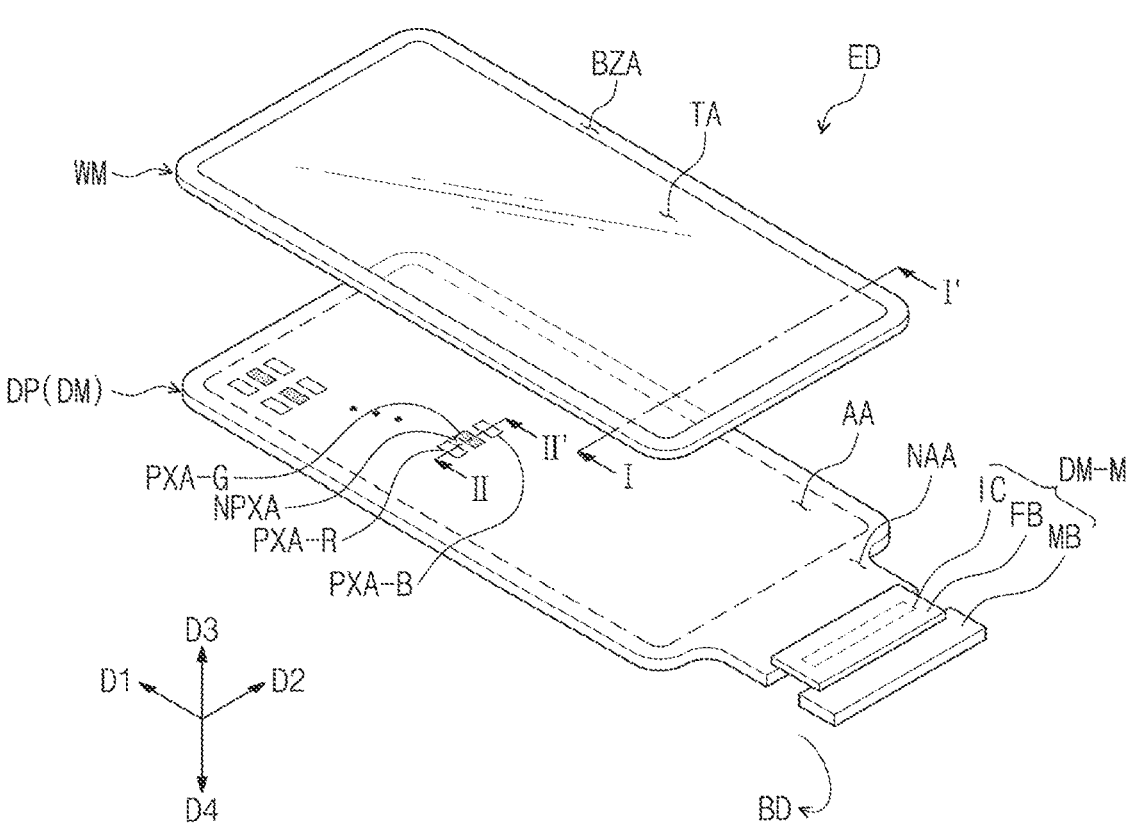
FIG. 2 is an exploded perspective view of the electronic device according to an embodiment of the invention.
Figure 3:
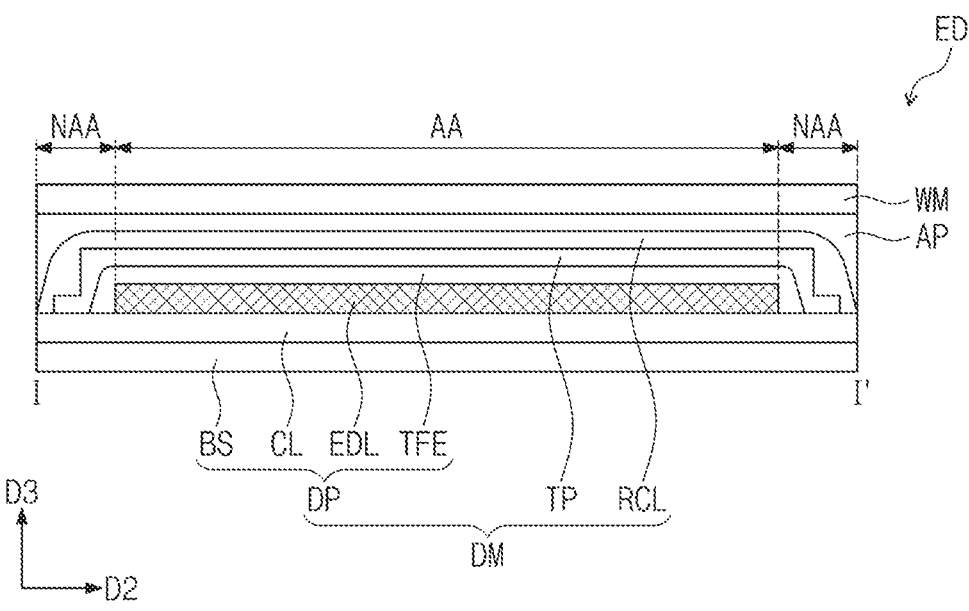
FIG. 3 is a cross-sectional view of the electronic device according to an embodiment of the invention.

FIG. 1 is a combined perspective view of an electronic device according to an embodiment of the invention, FIG. 2 is an exploded perspective view of the electronic device according to an embodiment of the invention, and FIG. 3 is a cross-sectional view of the electronic device according to an embodiment of the invention.

Referring to FIGS. 1 to 3, the electronic device ED according to an embodiment of the invention may be activated based on an electrical signal. In an embodiment, for example, the electronic device ED may be a mobile phone, a tablet, a monitor, a television, a car navigation system, a game machine, or a wearable device, but the embodiment of the invention is not limited thereto. FIG. 1 illustrates an embodiment where the electronic device ED is a mobile phone, as an example.

The electronic device ED according to an embodiment of the invention may display an image through an active region AA-ED. The active region AA-ED may include a plane defined by a first direction D1 and a second direction D2. In an embodiment, the active region AA-ED may further include a curved surface bent from at least one side of the plane defined by the first direction D1 and the second direction D2, but the embodiment of the invention is not limited thereto.

A peripheral region NAA-ED is adjacent to the active region AA-ED. The peripheral region NAA-ED may surround the active region AA-ED. Accordingly, the shape of the active region AA-ED may be substantially defined by the peripheral region NAA-ED. However, this is illustrated as an example, and the peripheral region NAA-ED may be disposed adjacent to only one side of the active region AA-ED, or may be omitted. The electronic device ED according to an embodiment of the invention may include the active region AA-ED having various shapes, and the invention is not limited to any one embodiment.

The electronic device ED according to an embodiment of the invention, as illustrated in FIG. 1, may include two curved surfaces respectively bent from two opposing sides of a flat surface defined by the first direction D1 and the second direction D2. However, the shape of the active region AA-ED is not limited thereto. In an alternative embodiment, for example, the active region AA-ED may include only the flat surface, and the active region AA-ED may further include at least two or more, for example, four curved surfaces respectively bent from four sides of the flat surface.

FIG. 1 and the following drawings illustrate first to fourth directions D1 to D4, and directions indicated by the first to fourth directions D1 to D4 described in this specification are relative concepts and may be converted into other directions.

In this specification, the first direction D1 and the second direction D2 may be orthogonal to each other, and the third direction D3 may be a direction normal to a plane defined by the first and second directions D1 and D2. The fourth direction D4 may be a direction normal to a plane defined by the first and second directions D1 and D2 and may be a direction opposite to the third direction D3.

A thickness direction of the electronic device ED may be parallel to the third direction D3 which is a direction normal to the plane defined by the first and second directions D1 and D2. In this specification, the front surface (or upper surface) and the rear surface (or lower surface) of members constituting the electronic device ED may be defined based on the third direction D3.

In this specification, the expression "on a plane" may mean when viewed on a plane parallel to the plane defined by the first direction D1 and the second direction D2, i.e., when viewed in a thickness direction or in the fourth direction DR4. In this specification, the word "overlapping" may mean overlapping on a plane or in the thickness direction (i.e., the third direction D3 or the fourth direction DR4) unless otherwise defined.

The electronic device ED according to an embodiment of the invention may include a display module DM, a driving portion DM-M, and a window WM. The display module DM may be a component that generates an image and senses externally applied pressure. The display module DM according to an embodiment of the invention includes a display panel DP. The display module DM according to an embodiment of the invention may further include a sensor layer TP disposed on the display panel DP and an optical layer RCL disposed on the sensor layer TP. However, the embodiment of the invention is not limited thereto, and in an alternative embodiment of the invention, the sensor layer TP or the optical layer RCL may be omitted.

An active region AA and a peripheral region NAA may be defined in the display module DM. The active region AA may be activated based on an electrical signal. The peripheral region NAA may be positioned adjacent to at least one side of the active region AA.

The active region AA may correspond to the active region AA-ED of the electronic device ED illustrated in FIG. 1. The peripheral region NAA may correspond to the peripheral region NAA-ED of the electronic device ED illustrated in FIG. 1.

Referring to FIG. 2, the active region AA may include a plurality of light-emitting regions PXA-R, PXA-G, and PXA-B. The light-emitting regions PXA-R. PXA-G, and PXA-B may be distinguished from each other and controlled independently of each other. In an embodiment, for example, the electronic device ED may include a first light-emitting region PXA-R, a second light-emitting region PXA-G, and a third light-emitting region PXA-B. The first to third light-emitting regions PXA-R, PXA-G, and PXA-B may respectively emit light of different colors. In an embodiment of the invention, the first light-emitting region PXA-R may be a red light-emitting region configured to emit red light, the second light-emitting region PXA-G may be a green light-emitting region configured to emit green light, and the third light-emitting region PXA-B may be a blue light-emitting region configured to emit blue light. However, this is illustrated as an example, and alternatively, at least some of the first to third light-emitting regions PXA-R, PXA-G, and PXA-B may emit light of a same color as each other, and the invention is not limited to any one embodiment.

When viewed on a plane, the first to third light-emitting regions PXA-R, PXA-G, and PXA-B may be separated from each other without overlapping each other. In an embodiment, for example, a non-light-emitting region NPXA may be disposed between neighboring light-emitting regions PXA-R, PXA-G, and PXA-B.

In an embodiment, as shown in FIG. 2, for example, the light-emitting regions PXA-R, PXA-G, and PXA-B may be arranged in a stripe shape. That is, in the electronic device ED according to an embodiment of the invention illustrated in FIG. 2, the first light-emitting region PXA-R, the second light-emitting region PXA-G, and the third light-emitting region PXA-B may be alternately arranged in the order listed above along the second direction D2.

In embodiments, the arrangement shape of the light-emitting regions PXA-R, PXA-G, and PXA-B is not limited to what is illustrated in FIG. 2, and the order in which the red light-emitting region PXA-R, the green light-emitting region PXA-G, and the blue light-emitting region PXA-B are arranged may be provided in various combinations according to the characteristics of display quality desired for the electronic device ED. In an embodiment, for example, the light-emitting regions PXA-R, PXA-G, and PXA-B may have a PENTILE™ or Diamond Pixel™ arrangement shape.

In an embodiment of the invention, the areas of light-emitting regions PXA-R, PXA-G, and PXA-B configured to emit light of different wavelength ranges among the plurality of light-emitting regions PXA-R, PXA-G, and PXA-B may be different from each other. In such an embodiment, the area may mean an area when viewed on a plane defined by the first direction D1 and the second direction D2. However, the embodiment of the invention is not limited thereto, and the light-emitting regions PXA-R, PXA-G, and PXA-B may have a same area as each other. In addition, the ratio of the areas may be adjusted in various ways according to the characteristics of display quality desired for the electronic device ED, and the shapes of the light-emitting regions PXA-R, PXA-G, and PXA-B on a plane are also variously modified.

FIG. 2 illustrates an embodiment where each of the light-emitting regions PXA-R, PXA-G, and PXA-B has a tetragonal shape on a plane, but the embodiment of the invention is not limited thereto, and alternatively, each of the light-emitting regions PXA-R, PXA-G, and PXA-B may have a polygonal shape, a circular shape, or the like on a plane.

The peripheral region NAA may surround the active region AA. However, the embodiment of the invention is not limited thereto, and alternatively, a portion of the peripheral region NAA may be omitted. A driving circuit or a driving line for driving the active region AA may be disposed in the peripheral region NAA.

In an embodiment of the invention, the display panel DP may be configured to substantially generate an image. The display panel DP may be a light-emitting display panel. In an embodiment, for example, the display panel DP may be an organic light-emitting display panel, an inorganic light-emitting display panel, a quantum dot display panel, a micro light emitting diode (LED) display panel, or a nano LED display panel. Hereinafter, the display panel DP according to an embodiment of the invention is described as an organic light-emitting display panel.

FIG. 3 may be a cross-sectional view taken along line I-I' of FIG. 2 according to an embodiment of the invention. Referring to FIG. 3, in an embodiment of the electronic device ED, the display module DM and the window WM may be coupled to each other by an adhesive layer AP. However, this is illustrated as an example, and alternatively, the adhesive layer AP may be omitted in the display module DM. The display module DM may include a display panel DP, a sensor layer TP, and an optical layer RCL. The display panel DP may include a base layer BS, a circuit layer CL, a light-emitting element layer EDL, and an encapsulation layer TFE.

The base layer BS may be a member configured to provide a base surface on which the circuit layer CL is disposed. The base layer BS may be a rigid substrate or a flexible substrate capable of being bent, folded, or rolled. The base layer BS may be a glass substrate, a metal substrate, or a polymer substrate. However, the embodiment of the invention is not limited thereto, and the base layer BS may be an inorganic layer, an organic layer, or a composite material layer.

The circuit layer CL may be disposed on the base layer BS. The circuit layer CL may include an insulating layer, a semiconductor pattern, a conductive pattern, a signal line, and the like. An insulating layer, a semiconductor layer, and a conductive layer may be formed on the base layer BS by a method such as coating or deposition, and then, the insulating layer, the semiconductor layer, and the conductive layer may be selectively patterned through a plurality of photolithography and etching processes. Thereafter, the semiconductor pattern, the conductive pattern, and the signal line included in the circuit layer CL may be formed.

The light-emitting element layer EDL may be disposed on the circuit layer CL. The light-emitting element layer EDL may include a light-emitting element. In an embodiment, for example, the light-emitting element may contain an organic light-emitting material, an inorganic light-emitting material, an organic-inorganic light-emitting material, a quantum dot, a quantum rod, a micro LED, or a nano LED.

The encapsulation layer TFE may be disposed on the light-emitting element layer EDL. The encapsulation layer TFE may cover the light-emitting element layer EDL. The encapsulation layer TFE may be disposed in the active region AA, in which the light-emitting element layer EDL is disposed, and may be disposed to extend to the peripheral region NAA in which the light-emitting element layer EDL is not disposed.

The encapsulation layer TFE may protect the light-emitting element layer EDL from moisture, oxygen, and foreign substances such as dust particles. The encapsulation layer TFE according to an embodiment of the invention will be described in more detail later.

The sensor layer TP may be disposed on the display panel DP. The sensor layer TP may sense an external input applied from the outside. The external input may be a user's input. The user's input may include various types of external inputs, such as a part of the user's body, light, heat, a pen, or pressure.

In an embodiment, the sensor layer TP may be formed on the display panel DP through a continuous process. In such an embodiment, the sensor layer TP may be directly disposed on the display panel DP. Here, the expression "directly disposed" may mean that a third component is not disposed between the sensor layer TP and the display panel DP. That is, a separate adhesive member may not be disposed between the sensor layer TP and the display panel DP. In an embodiment, for example, the sensor layer TP may be directly disposed on the encapsulation layer TFE of the display panel DP. The sensor layer TP may be coupled to the display panel DP by an adhesive member. The adhesive member may contain a conventional adhesive or a pressure-sensitive adhesive. However, this is illustrated as an example, and alternatively, the sensor layer TP may be provided on the display panel DP after being formed on a separate substrate, or may be coupled to the display panel DP by a separate adhesive member or the like. Alternatively, the sensor layer TP may be formed inside the display panel DP, and the invention is not limited to any one embodiment.

The optical layer RCL may be disposed on the sensor layer TP. The optical layer RCL may be directly disposed on the sensor layer TP. The optical layer RCL may be formed on the sensor layer TP through a continuous process. The optical layer RCL may reduce the reflectance of external light incident from the outside of the display module DM. The optical layer RCL may include a polarization layer, a color filter layer, a dye-containing layer, or a black matrix. In an alternative embodiment of the invention, the optical layer RCL may be omitted.

In an embodiment of the invention, the sensor layer TP may be omitted. In such an embodiment, the optical layer RCL may be directly disposed on the display panel DP. In an embodiment of the invention, the positions of the sensor layer TP and the optical layer RCL may be interchanged with each other.

Referring back to FIG. 2, the electronic device ED may include the driving portion DM-M electrically connected to the display module DM. The driving portion DM-M may be electrically connected to the display panel DP and the sensor layer TP. The driving portion DM-M may include a driving chip IC. The driving chip IC may generate or process various electrical signals, and the driving chip IC may be electrically connected to and control the display panel DP, the sensor layer TP, and the like.

The driving portion DM-M may include a flexible circuit board FB and a driving circuit board MB. One side of the flexible circuit board FB may be electrically connected to the display panel DP and the sensor layer TP and another side (or an opposing side) thereof may be electrically connected to the driving circuit board MB. The driving chip IC may be disposed on the flexible circuit board FB. In this case, the flexible circuit board FB may also be referred to as a chip on film (CoF). In an alternative embodiment, the driving chip IC may be disposed on the base layer BS of the display module DM.

FIG. 2 illustrates an embodiment where the driving portion DM-M is connected to one side of the display module DM and unfolded, but the embodiment of the invention is not limited thereto, and in the electronic device ED according to an alternative embodiment of the invention, the driving portion DM-M may be disposed to be bent in the fourth direction D4. In an embodiment, for example, the driving portion DM-M may be bent and disposed to overlap the display panel DP on a plane. However, this is illustrated as an example, and in the electronic device ED according to an embodiment of the invention, the driving portion DM-M may be provided by being integrally formed with the display module DM, and the invention is not limited to any one embodiment.

The window WM may cover the entire outer side of the display module DM. The window WM may have a shape corresponding to the shape of the display module DM. In the electronic device ED according to an embodiment of the invention, the window WM may include or contain an optically transparent insulating material. The window WM may be a glass substrate or a polymer substrate. In an embodiment, for example, the window WM may be a chemically strengthened glass substrate.

The window WM may be divided into a transmission portion TA and a bezel portion BZA. The transmission portion TA may correspond to the active region AA of the display module DM, and the bezel portion BZA may correspond to the peripheral region NAA of the display module DM. The bezel portion BZA may define the shape of the transmission portion TA. The bezel portion BZA may be adjacent to and surround the transmission portion TA. However, the embodiment of the invention is not limited to what is illustrated, and the bezel portion BZA may be disposed adjacent to only one side of the transmission portion TA, or a portion thereof may be omitted.

Figure 4A:
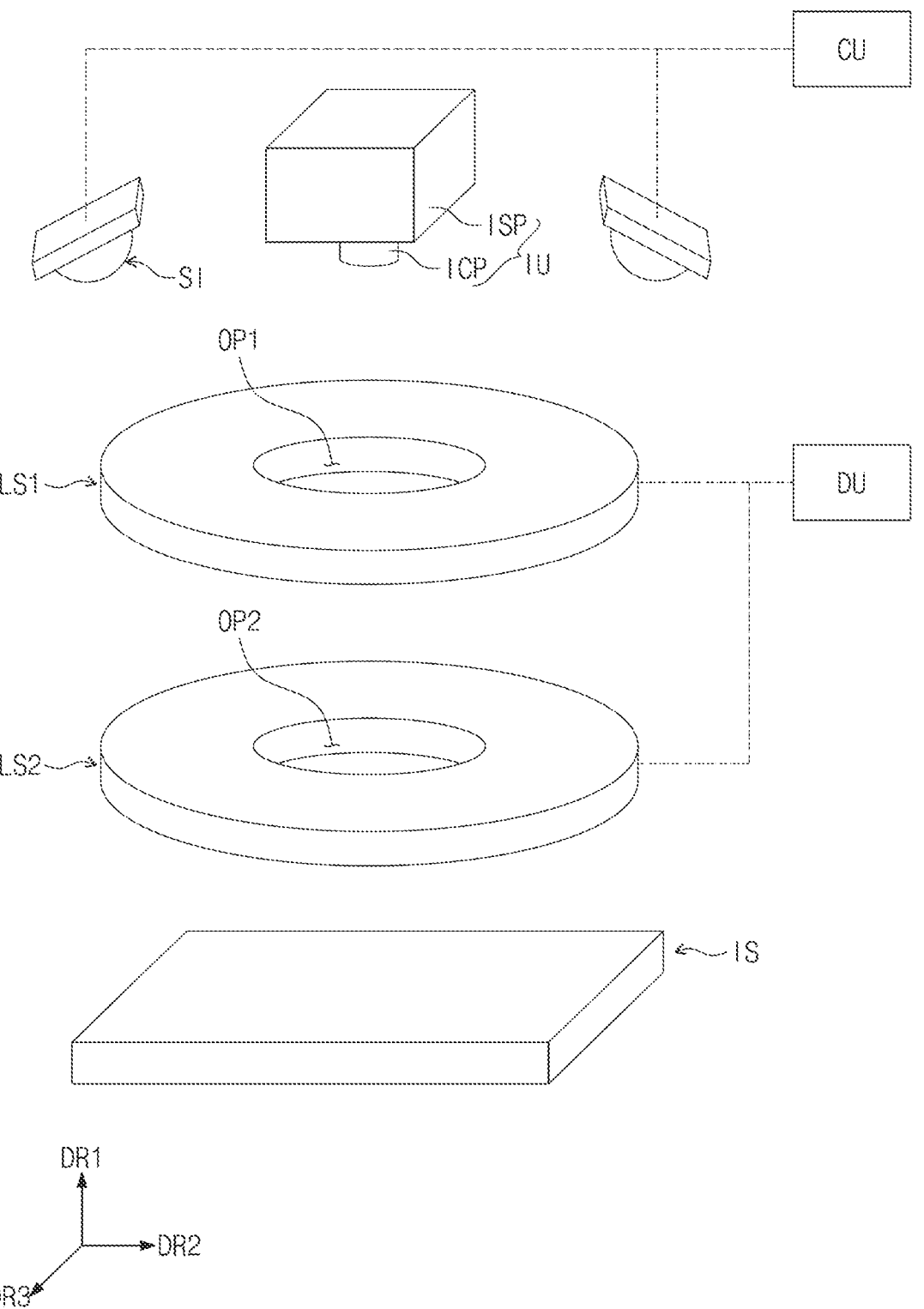
FIG. 4A is a perspective view of an inspection apparatus according to an embodiment of the invention.
Figure 4B:
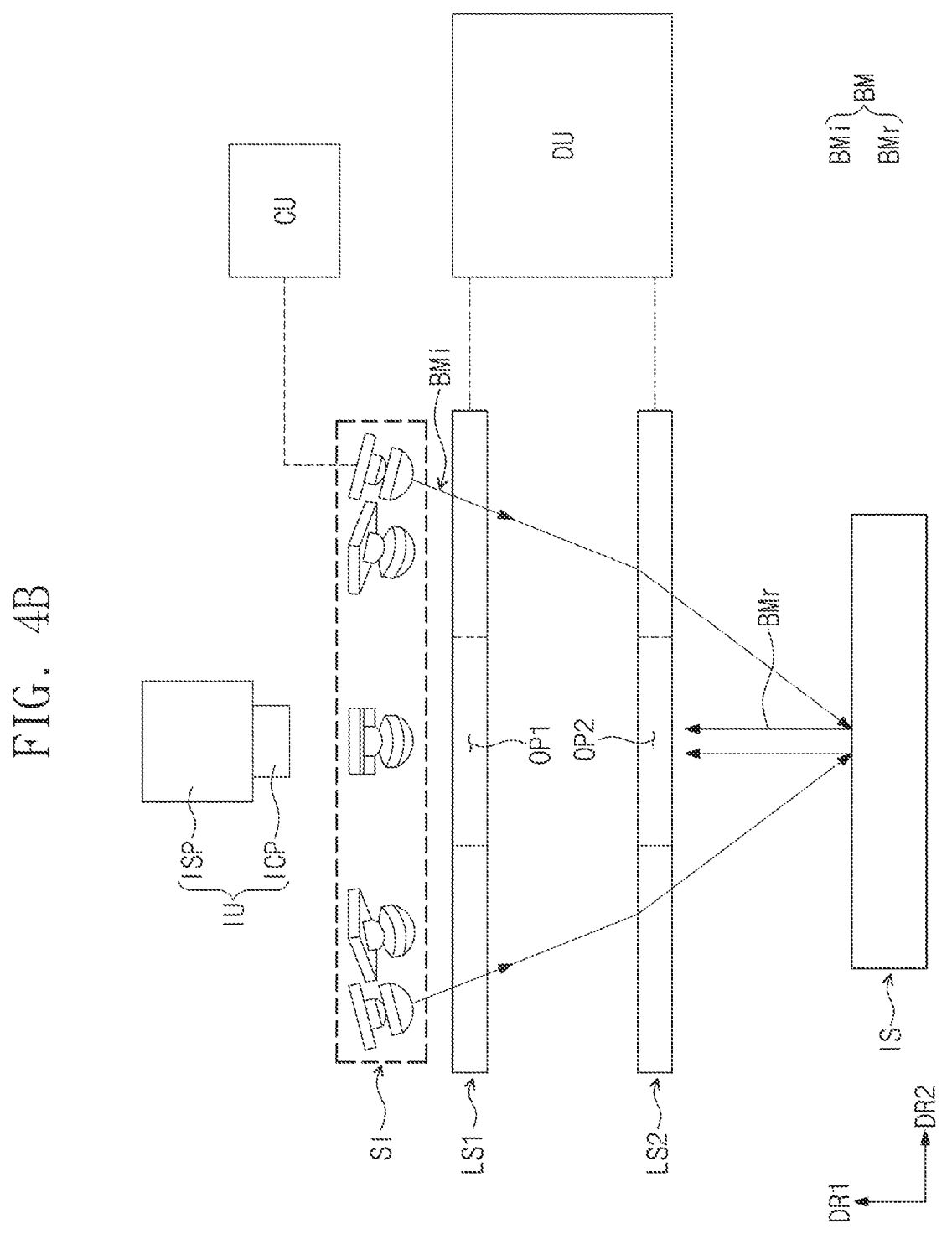
Figure 4C:
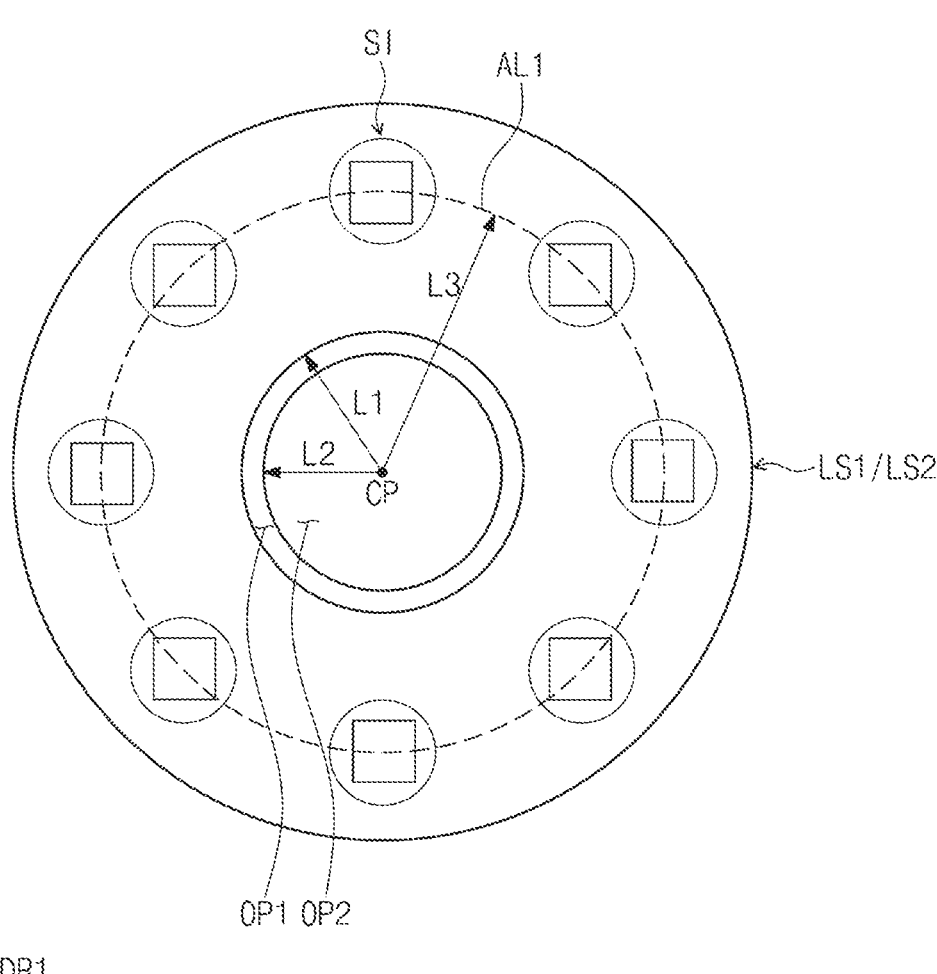
FIG. 4C is a plan view of the inspection apparatus according to an embodiment of the invention.
Figure 4C:
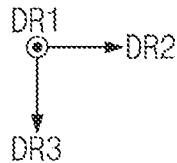

FIG. 4A is a perspective view of an inspection apparatus according to an embodiment of the invention, FIG. 4B is a front view of the inspection apparatus according to an embodiment of the invention, and FIG. 4C is a plan view of the inspection apparatus according to an embodiment of the invention.

A first direction DR1, a second direction DR2, and a third direction DR3 described below may be different from the first direction D1 (see FIG. 1), the second direction D2 (see FIG. 1), and the third direction D3 (see FIG. 1) described in FIGS. 1 to 3 and are not limited to the aforementioned directions.

Referring to FIGS. 4A and 4B, the inspection apparatus according to an embodiment of the invention may include a light source S1, a first lens LS1, a second lens LS2, an inspection unit IU, a control unit CU, and a driving unit DU.

The inspection apparatus may inspect a state of an inspection object IS. The state of the inspection object IS that can be measured by the inspection apparatus may include, for example, a short circuit defect, an open defect, presence or absence of fine particles, foreign substances, or film residues, or the like, but the embodiment of the invention is not limited thereto, and other states of the inspection object IS may be additionally measured.

The inspection object IS may be the aforementioned display module DM (see FIG. 3) or a portion of the display module DM (see FIG. 3), for example, the display panel DP (see FIG. 3). Alternatively, the inspection object IS may include only some components of the display panel DP (see FIG. 3). That is, the inspection apparatus may be an inspection apparatus configured to be used in (e.g., during or after) some steps or processes of a manufacturing process of the display panel DP (see FIG. 3), an apparatus configured to inspect a mother board including a plurality of display panels DP (see FIG. 3), an apparatus configured to inspect the formed display panel DP (see FIG. 3), or an apparatus configured to inspect the formed display module DM (see FIG. 3). The inspection object IS may include various components according to the input timing of the inspection apparatus during a manufacturing process of the electronic device ED (see FIG. 1), and the invention is not limited to any one embodiment.

In an embodiment, as shown in FIG. 4B, the light source S1 may emit a beam BM. At least a portion of the beam BM emitted from the light source S1 may be radiated to the inspection object IS. At least a portion of the beam BM emitted from the light source S1 and radiated to the inspection object IS may reach the inspection object IS through the first lens LS1 and the second lens LS2. The beam BM radiated to the inspection object IS may be reflected from the inspection object IS and may be incident on the inspection unit IU.

The light source S1 may include a light path changing member. The light path changing member may change a path of the beam BM radiated from the light source S1. In an embodiment, for example, the light path changing member may be an auxiliary lens or an auxiliary mirror, and the light path changing member may be disposed on a path of the beam BM and change the path of the beam BM so that at least a portion of the beam BM emitted from the light source S1 may reach the inspection object IS through the first lens LS1 and the second lens LS2.

The light source S1 may be tilted at a predetermined angle to form a predetermined angle with respect to a normal line of the upper surface of the inspection object IS. An angle formed by the light source S1 with respect to the normal line of the inspection object IS may vary depending on a measurement region of the inspection object IS and a design condition of the inspection apparatus, but the invention is not limited to any one embodiment. In an embodiment, for example, the angle between the light source S1 and the normal line of the inspection object IS may be in a range about 14 degrees to about 50 degrees.

The first lens LS1 may be disposed between the inspection object IS and the light source S1. The first lens LS1 is provided with a first opening OP1 defined therein and formed therethrough along the first direction DR1. The first direction DR1 may be parallel to the normal direction of the upper surface of the inspection object IS.

A portion of the beam BM radiated from the light source S1 may be incident on a portion of the first lens LS1 that does not overlap the first opening OP1, and a portion of the beam BM reflected from the inspection object IS may be incident on the incidence portion ICP of the inspection unit IU through the first opening OP1. In this case, the portion of the beam BM reflected from the inspection object IS may be a beam BM reflected by the inspection object IS and then passing through a second opening OP2 in the second lens LS2, and the invention is not limited to any one embodiment.

The second lens LS2 may be disposed between the inspection object IS and the first lens LS1. The second lens LS2 may have a predetermined radius of curvature or may be an aspherical lens. The radius of curvature of the second lens LS2 may be different from or equal to that of the first lens LS1, and the invention is not limited to any one embodiment.

A portion of the beam BM radiated from the light source S1 may be incident on a portion of the second lens LS2 that does not overlap the first opening OP1, and a portion of the beam BM reflected from the inspection object IS may be incident on the incidence portion ICP of the inspection unit IU through the second opening OP2. In this case, the portion of the beam BM radiated from the light source S1 may be a beam BM incident on a portion of the first lens LS1 that does not overlap the first opening OP1, and the invention is not limited to any one embodiment.

In an embodiment, a radius L1 of the first opening OP1 (see FIG. 4C) may be equal to or greater than a radius L2 of the second opening OP2 (see FIG. 4C). In such an embodiment the radius L1 (see FIG. 4C) of the first opening OP1 is greater than the radius L2 (see FIG. 4C) of the second opening OP2, such that the beam BM, which is reflected from the inspection object IS and passes through the second opening OP2, is allowed to be incident on the inspection unit IU through the first opening OP1 without being blocked by the first lens LS1.

The first lens LS1 may be a Fresnel lens, an aspherical lens, or a convex lens. That is, the beam BM may be refracted or transmitted without refraction while passing through the first lens LS1 according to the refractive index of the first lens LS1. In an embodiment, without being limited thereto, the first lens LS1 may be a concave lens, and the invention is not limited to any one embodiment.

The second lens LS2 may be a Fresnel lens, an aspherical lens, or a convex lens. That is, the beam BM may be refracted or transmitted without refraction while passing through the second lens LS2 according to the refractive index of the second lens LS2.

According to embodiments of the invention, a path of the beam BM may be finely adjusted by a combination of the first lens LS1 and the second lens LS2. That is, by controlling the path of the beam BM in various ways by various combinations of the first lens LS1 and the second lens LS2, the path of the beam BM may be precisely controlled, such that a dark field angle may be changed, and a desired region may be effectively measured, thereby improving the accuracy of inspection.

The inspection apparatus according to embodiments of the invention may inspect a short circuit defect, an open defect, the presence or absence of fine particles, or the like in units of several micrometers to several tens of micrometers by such an optical inspection method. In such embodiments, it is possible to inspect the presence or absence of foreign substances or film residues of several hundred micrometers (μm) or more.

The beam BM emitted from the light source S1 may be incident on the inspection object IS through the first lens LS1 and the second lens LS2. A beam BMi incident on the inspection object IS may be reflected from the inspection object IS and reach the inspection unit IU.

The inspection unit IU may receive a beam BMr reflected from the inspection object IS and inspect the state of the inspection object IS. That is, the beam BMr reflected from the inspection object may include the information on the state of the inspection object IS. The beam BMr reflected from the inspection object IS may be incident on the inspection unit IU through the first opening OP1 and the second opening OP2. Accordingly, the reflected beam BMr including the information on the state of the inspection object IS may be stably incident on the inspection unit IU without being distorted by the lenses. Accordingly, inspection reliability may be improved.

The inspection unit IU may include an incidence portion ICP, on which the reflected beam BMr is incident, and an inspection portion ISP configured to analyze the beam BMr incident on the incidence portion ICP. As described above, the beam BMr reflected from the inspection object IS and passing through the first opening OP1 and the second opening OP2 may be incident on the incidence portion ICP. By analyzing the beam BMr reflected from the inspection object IS and passing through the first opening OP1 and the second opening OP2, the inspection portion ISP may inspect the defects of the inspection object IS based on a predetermined dark field angle.

The inspection unit IU may be disposed to be spaced apart from the inspection object IS with the first lens LS1 interposed therebetween. In an embodiment, for example, the inspection unit IU may be disposed at a central position to have a same distance from a plurality of light sources S1 arranged in a circle, or may be disposed at a position spaced further apart in the first direction DR1 from the central position of the light sources S1, but the invention is not limited to any one embodiment.

The control unit CU may control the operation of the light source S1. In addition, the control unit CU may control the operation of each of the plurality of light sources S1.

According to an embodiment of the invention, the control unit CU may adjust the emission angle of the beam BM radiated from the light source S1. In addition, the control unit CU may control the switch on/off of the plurality of light sources S1.

The driving unit DU may adjust at least one of a distance between the first lens LS1 and the inspection object IS or a distance between the second lens LS2 and the inspection object IS. In an embodiment, the driving unit DU may adjust a first distance in the first direction DR1 between the first lens LS1 and the inspection object IS and a second distance in the first direction DR1 between the second lens LS2 and the inspection object IS by moving the first lens LS1 or the second lens LS2.

In addition, the driving unit DU may rotate at least one of the first lens LS1 or the second lens LS2 with a rotation axis in the first direction DR1. an embodiment, the driving unit DU may rotate at least one of the first lens LS1 or the second lens LS2 with a rotation axis in a direction parallel to the normal direction of the inspection object IS.

Referring to FIG. 4C, the light source S1 may be provided in plurality. A plurality of light sources S1 may be disposed to be spaced apart from the inspection object IS in a direction parallel to the thickness direction (hereinafter, the first direction DR1) of the inspection object IS.

The plurality of light sources S1 may be disposed in a circle along a first alignment line AL1 having a circular shape and defined as being spaced apart from a center point thereof by a predetermined distance L3. In an embodiment, the plurality of light sources S1 may be disposed in a circle to be spaced apart from each other along the first alignment line AL1 defined as being spaced apart by the predetermined distance L3 from the center CP of the first opening OP1 defined in the first lens LS1.

Hereinafter, the center CP of the first opening OP1 will be described as corresponding to a center line passing through the center CP and parallel to the first direction DR1.

A distance between each of the plurality of light sources S1 and the center CP of the first opening OP1 may be greater than the radius of the first opening OP1 and the radius of the second opening OP2. In an embodiment, the separation distance L3 between the plurality of light sources S1 and the center CP may be greater than the radius L1 of the first opening OP1 and the radius L2 of the second opening OP2. In such an embodiment, the beam BM emitted from the plurality of light sources S1 may be effectively prevented from being incident on the inspection object IS through the first opening OP1 and the second opening OP2 without passing through the first lens LS1 and the second lens LS2.

Figure 5A:
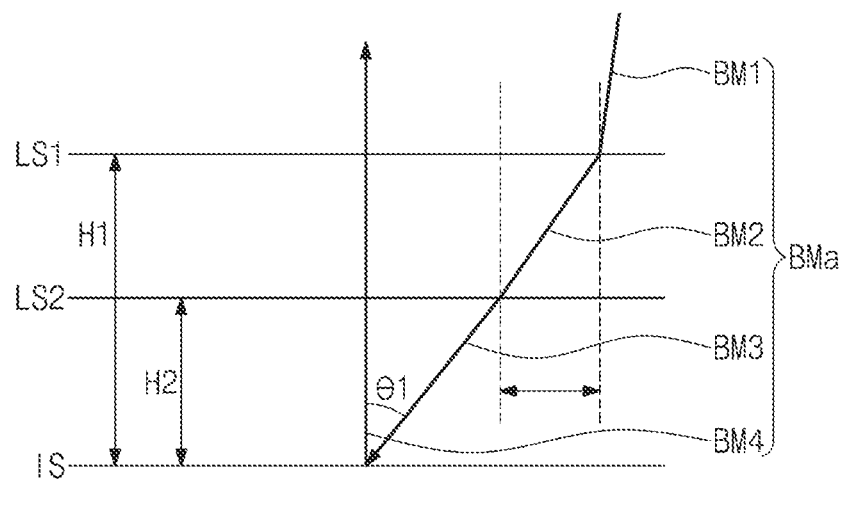
FIGS. 5A and 5B are schematic diagrams illustrating a path change of a beam according to the movement of a lens according to an embodiment of the invention.
Figure 5A:
Figure 5B:
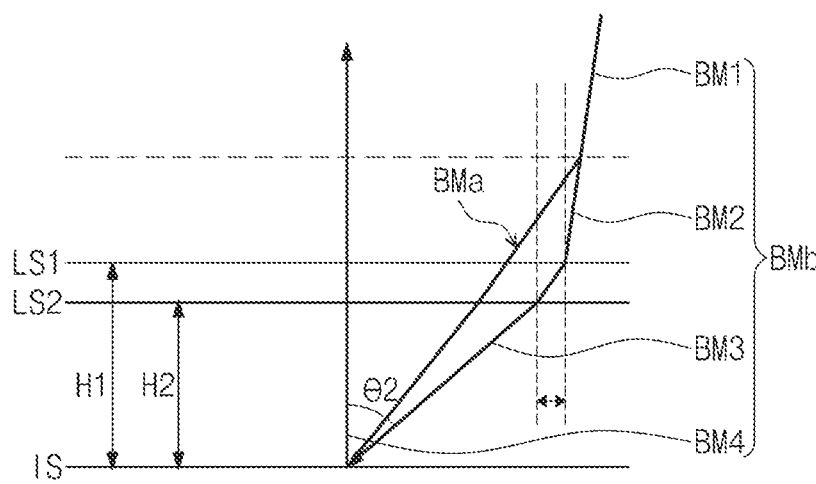
Figure 5B:
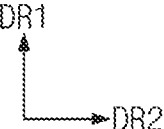

FIGS. 5A and 5B are schematic diagrams illustrating a path change of a beam according to the movement of a lens according to an embodiment of the invention.

Referring to FIG. 5A, a beam BMa may pass through the first lens LS1 and the second lens LS2 and be reflected from the inspection object IS. The beam BMa may be classified into a first beam BM1 before being incident on the first lens LS1, a second beam BM2 passing through the first lens LS1, a third beam BM3 passing through the second lens LS2 and incident on the inspection object, and a fourth beam BM4 reflected from the inspection object IS. The fourth beam BM4 reflected from the inspection object IS may be incident on the incidence portion ICP (see FIG. 4B) of the aforementioned inspection unit IU (see FIG. 4B).

According to embodiments of the invention, the path of the second beam BM2 may be changed by adjusting the curvature (or radius of curvature) of the first lens LS1, and the path of the third beam BM3 may be changed by adjusting the curvature (or radius of curvature) of the second lens LS2. Depending on the path of the third beam BM3, an incident angle θ1 or an incident position of the third beam BM3 on the inspection object IS is determined, and through this, a dark field angle is determined. In other words, by adjusting the curvature of the first lens LS1 or the curvature of the second lens LS2, the dark field angle and the incident angle θ1 or the incident position of the third beam BM3 with respect to the inspection object IS may be changed.

In FIG. 5A, the curvature of the first lens LS1 may be greater than that of the second lens LS2. In this case, it can be confirmed that the third beam BM3 is incident on the inspection object IS at a predetermined angle θ1. However, the curvature of the first lens LS1 is not always greater than the curvature of the second lens LS2 and may be smaller than or equal to the curvature of the second lens LS2.

The first lens LS1 and the second lens LS2 according to an embodiment of the invention may move along the first direction DR1 by the aforementioned driving unit DU (see FIG. 4B). FIG. 5B illustrates a state in which the first lens LS1 is moved in a direction closer to the inspection object IS, that is, in a direction opposite to the first direction DR1, without a change in curvature or refractive index.

According to the movement of the first lens LS1 in the first direction DR1, a first separation distance H1 between the first lens LS1 and the inspection object IS may vary. Referring to FIGS. 5A and 5B, as the first lens LS1 moves in the first direction DR1, the first separation distance H1 decreases. As a result, the path of a beam BMb may be changed.

As the first separation distance H1 decreases, the path of the second beam BM2 is changed, and as the path of the second beam BM2 changes, the path of the third beam BM3 is changed. A predetermined angle at which the third beam BM3 is incident on the inspection object IS may be different from what is illustrated in FIG. 5A. Due to this, an incident angle θ2 of the third beam BM3 with respect to the inspection object IS may be changed. That is, as the first lens LS1 moves in the first direction, the dark filed angle and the incident angle θ2 or the incident position of the third beam BM3 with respect to the inspection object IS may be changed.

In an embodiment, the driving unit DU (see FIG. 4B) may move the second lens LS2 together with the first lens LS1 in the first direction DR1 and may move only the second lens LS2 in the first direction DR1. Through this, as described above, the path of the third beam BM3 may be changed and the dark field angle may be changed.

That is, the dark field angle may be changed by adjusting the curvatures of the first lens LS1 and the second lens LS2. In addition, the dark field angle may be changed by adjusting the first separation distance H1 between the first lens LS1 and the inspection object IS and a second separation distance H2 between the second lens LS2 and the inspection object IS.

Figure 6A:
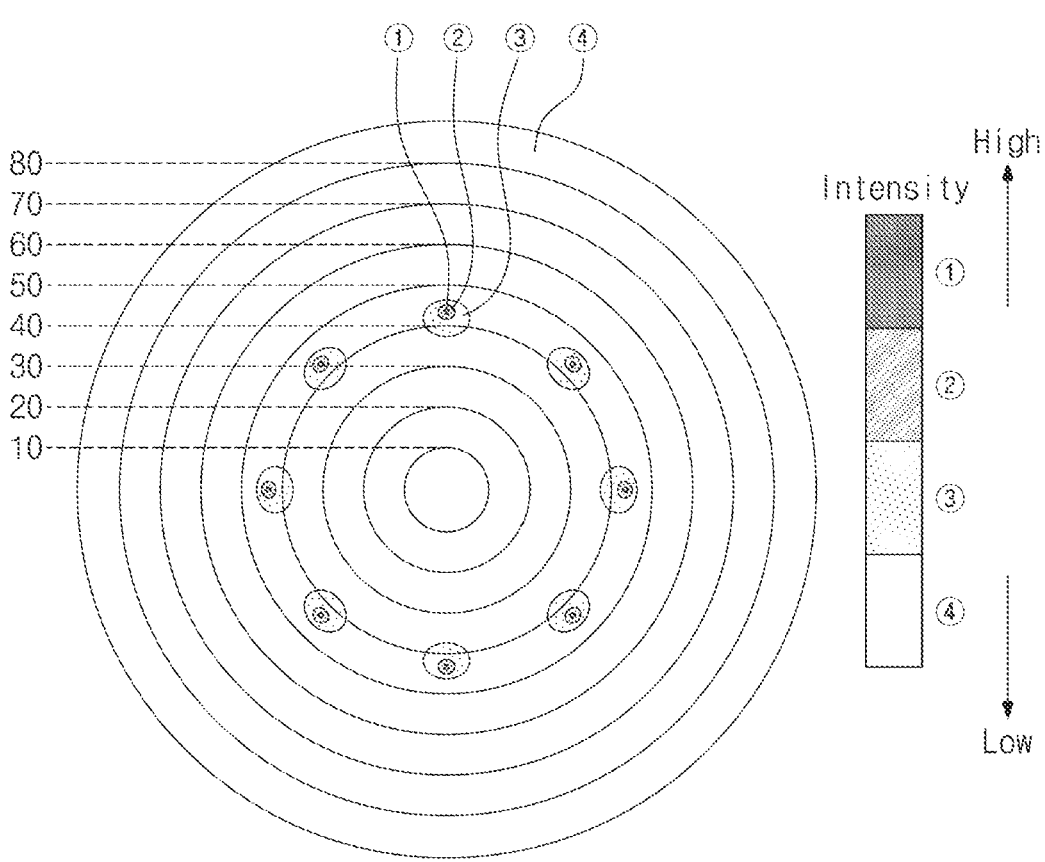
FIGS. 6A and 6B illustrate a dark field angle range when an intensity measured by the inspection apparatus according to an embodiment of the invention is greater than or equal to a predetermined intensity.
Figure 6B:
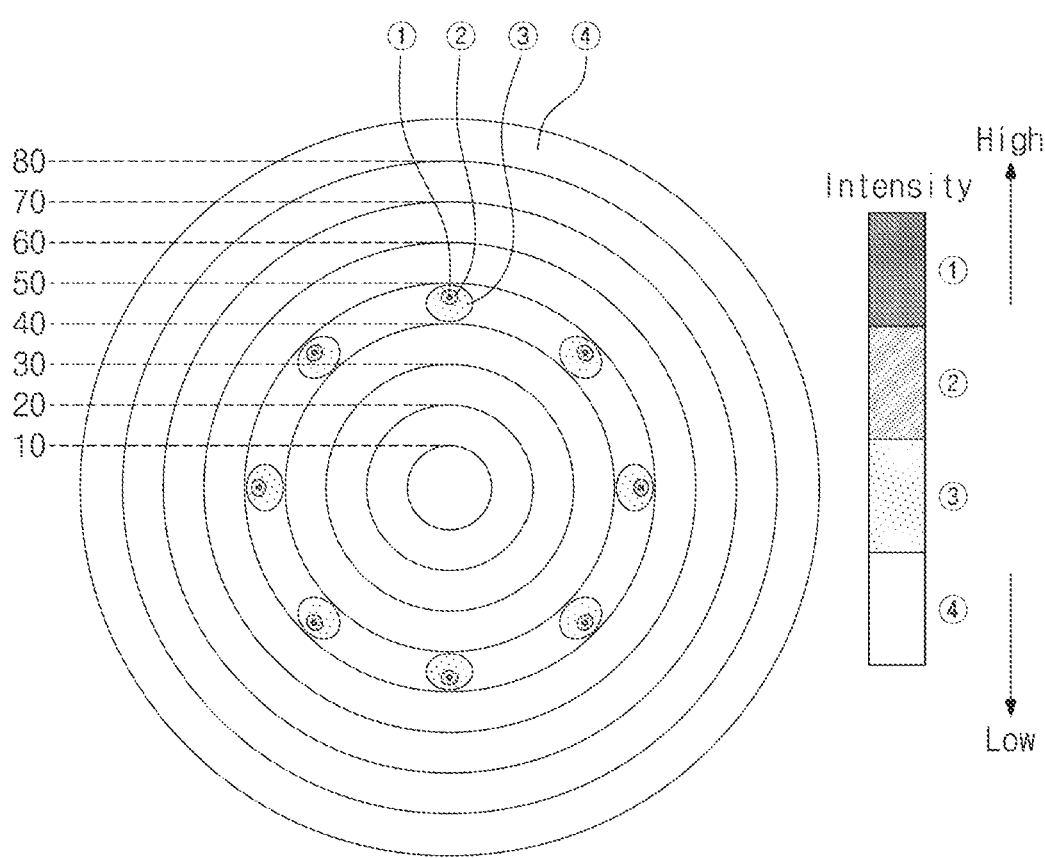

FIGS. 6A and 6B illustrate a dark field angle range when an intensity measured by the inspection apparatus according to an embodiment of the invention is greater than or equal to a predetermined intensity.

FIG. 6A illustrates a dark field angle range in the state of FIG. 5A, and FIG. 6B illustrates a dark field angle range in the state of FIG. 5B. Referring to FIGS. 6A and 6B together, it can be confirmed that the dark field angle (or dark field angle range) is changed according to the movement of the first lens LS1 (see FIG. 5B). In Hereinafter, embodiments in which each of the first lens and the second lens is a convex lens will be described in detail as an example.

Referring to FIG. 6A, when a measured intensity is equal to or greater than a predetermined intensity, the dark field angle range is in a range about 40 degrees to about 45 degrees. Referring to FIG. 6B, when a measured intensity is equal to or greater than a predetermined intensity, the dark field angle range is in a range about degrees to about 50 degrees. As illustrated in FIG. 6B, by adjusting the first separation distance H1 (see FIG. 5B) between the first lens LS1 (see FIG. 5B) and the inspection object IS (see FIG. 5B), the dark field angle range may be shifted.

In an embodiment, as described above, the dark field angle (or the dark field angle range) may vary depending on the incident angle or incident position of the third beam BM3 (see FIG. 5B) on the inspection object IS (see FIG. 5B).

A predetermined region that can be inspected by the inspection apparatus among the inspection object IS (see FIG. 5B) may be represented by the dark field angle (or dark field angle range) which may vary depending on the incident angle or incident position of the third beam BM3 (see FIG. 5B) on the inspection object IS (see FIG. 5B). In order to set the dark field angle (or dark field angle range) so that the measured intensity is greater than or equal to a predetermined intensity in a predetermined region to be inspected to check whether a defect is in the inspection object IS (see FIG. 5B), as described above, the curvature of the lens or the separation distance between the lens and the inspection object IS (see FIG. 5B) may be changed.

FIGS. 7A to 7D are plan views illustrating light sources according to an embodiment of the invention.

Referring to FIGS. 7A to 7D, a light source SIa according to an embodiment of the invention may be provided in plurality. The plurality of light sources SIa may include a plurality of first light sources SI1 and a plurality of second light sources S12.

The plurality of first light sources SI1 may be arranged to be spaced apart from the center CP of the first opening OP1 by a first separation distance T1. In such an embodiment, the plurality of first light sources SI1 may be disposed along a circular shape having a radius of the first separation distance T1 from the center CP of the first opening OP1. Since the plurality of first light sources SI1 are circularly disposed along the center CP of the first opening OP, a beam emitted from the first light sources SI1 may be uniformly radiated on the inspection object IS (see FIG. 4B). In this case, angles formed by the first light sources SI1 with respect to the normal line of the upper surface of the inspection object IS (see FIG. 4B) may be the same as each other.

According to an embodiment of the invention, second light sources S12 adjacent to each other among the plurality of second light sources S12 may be arranged to be spaced apart from the center CP of the first opening OP1 by a second separation distance T2. In an embodiment, the plurality of second light sources S12 may be disposed along a circular shape having a radius of the second separation distance T2 from the center CP of the first opening OP1. Since the plurality of second light sources S12 are circularly disposed along the center CP of the first opening OP, a beam emitted from the second light sources S12 may be uniformly radiated on the inspection object IS (see FIG. 4B). In this case, angles formed by the second light sources S12 with respect to the normal line of the upper surface of the inspection object IS (see FIG. 4B) may be the same as each other.

The first separation distance T1 may be different from the second separation distance T2, but the embodiment of the invention is not limited thereto, and the first separation distance T1 and the second separation distance T2 may be the same as each other. Referring to FIGS. 4A and 4B, the first separation distance T1 may be smaller than the second separation distance T2, and referring to FIG. 4C, the first separation distance T1 may be provided to be the same as the second separation distance T2.

The plurality of first light sources SI1 and the plurality of second light sources S12 may be disposed to be aligned with each other when viewed from the center CP of the first opening OP1. In an embodiment, the plurality of first light sources SI1 and the plurality of second light sources S12 may be disposed to be aligned with each other based on an alignment line.

According to an embodiment of the invention, distances between first light sources SI1 adjacent to each other among the plurality of first light sources SI1 may be equal to each other. In an embodiment, angles formed by imaginary lines (hereinafter referred to as extension lines), which respectively extend from the centers of the first light sources SI1 adjacent to each other among the plurality of first light sources SI1 and pass through the center CP of the first opening OP1, may be equal to each other. In an embodiment, for example, an angle θ3 formed by the extension lines of first light sources SI1 adjacent to each other among the plurality of first light sources SI1 may be about 45 degrees.

According to an embodiment of the invention, distances between second light sources S12 adjacent to each other among the plurality of second light sources S12 may be equal to each other. In an embodiment, angles formed by extension lines, which respectively extend from the centers of the second light sources S12 adjacent to each other among the plurality of second light sources and pass through the center CP of the first opening OP1, may be equal to each other. In an embodiment, for example, an angle θ3 formed by the extension lines of second light sources S12 adjacent to each other among the plurality of second light sources S12 may be about degrees.

Figure 7A:
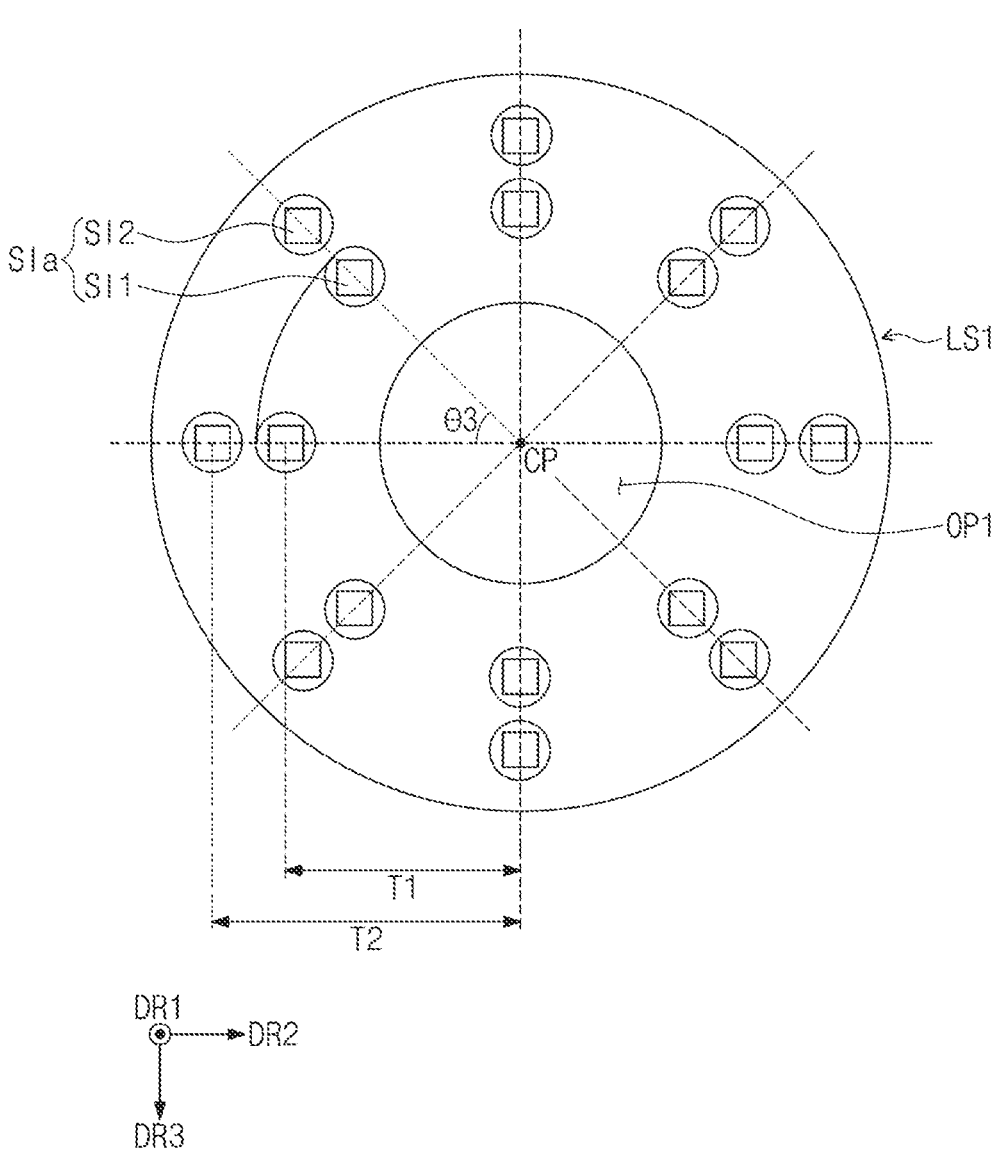
FIGS. 7A to 7D are plan views illustrating light sources according to an embodiment of the invention.
Figure 7B:
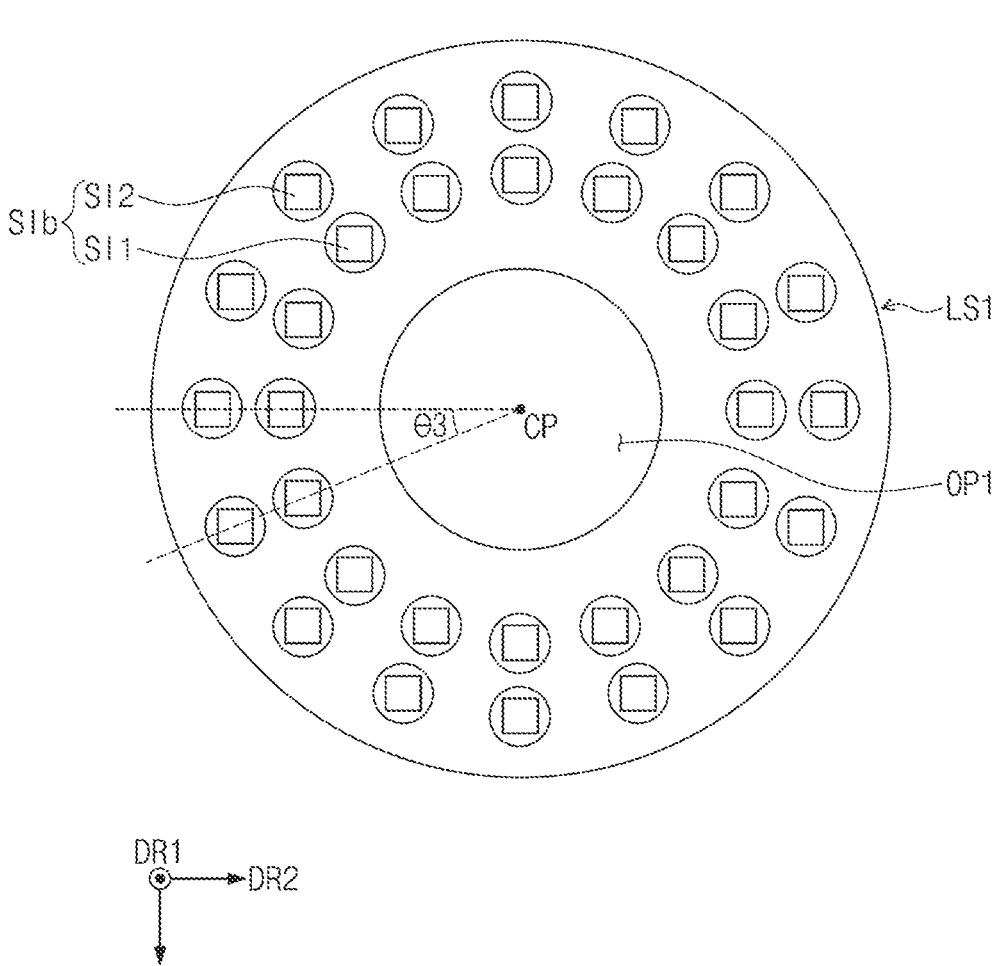

Referring to FIG. 7B, in an alternative embodiment, the angle θ3 formed by the extension lines of first light sources SI1 adjacent to each other among the plurality of first light sources SI1 may be about 22.5 degrees, and the angle θ3 formed by the extension lines of second light sources S12 adjacent to each other among the plurality of second light sources S12 may be about 22.5 degrees.

Figure 7C:
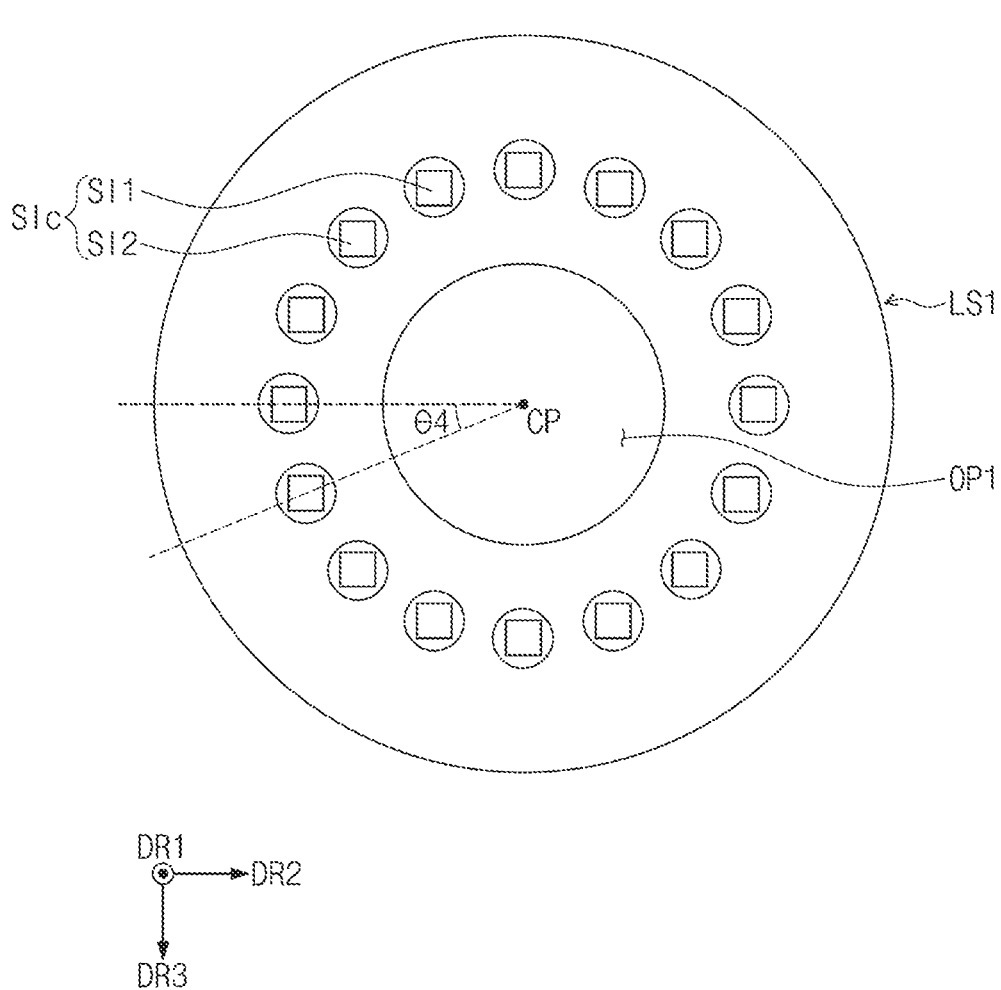

Referring to FIG. 7C, in another alternative embodiment, the first separation distance T1 (see FIG. 7A) and the second separation distance T2 (see FIG. 7A) may be the same as each other. The plurality of first light sources SI1 and the plurality of second light sources S12 may be alternately disposed. An angle θ4 formed by extension lines of the first light source SI1 and the second light source S12 adjacent to each other may be about 22.5 degrees.

Figure 7D:
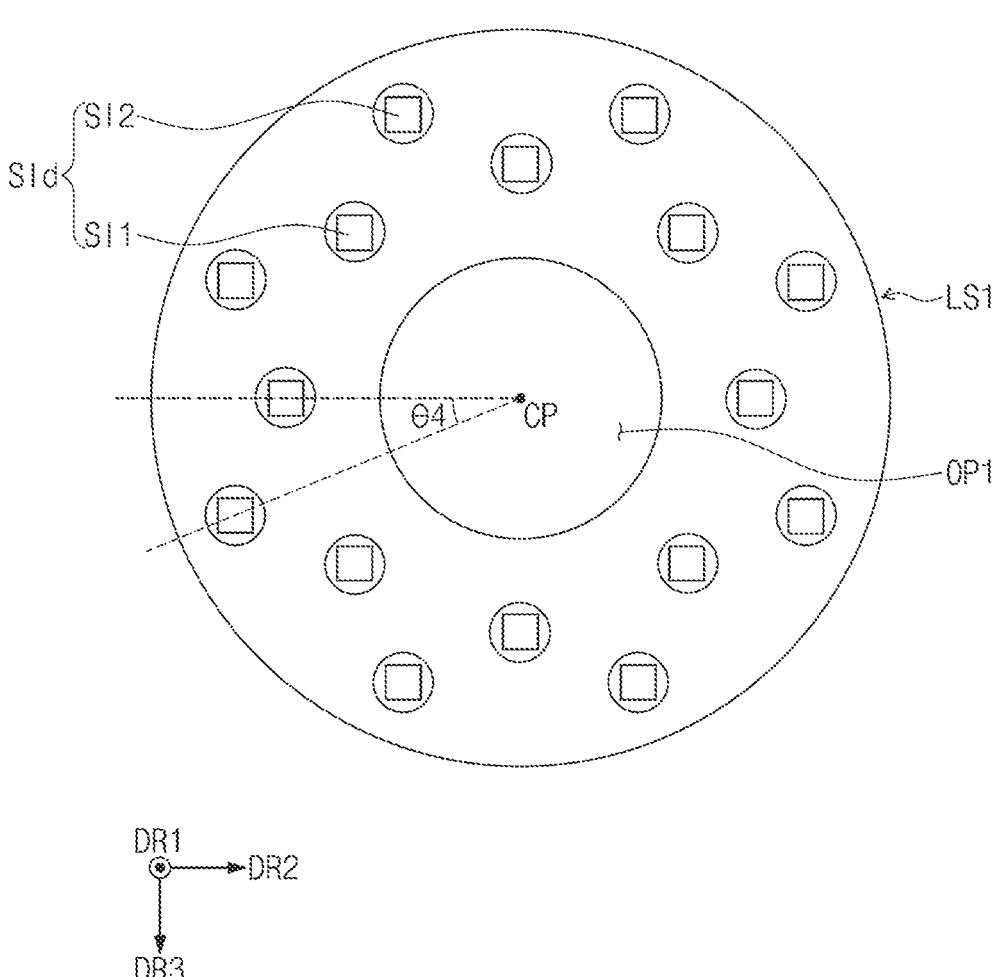

Referring to FIG. 7D, in another alternative embodiment, the second separation distance T2 (see FIG. 7A) may be greater than the first separation distance T1 (see FIG. 7A). The plurality of first light sources SI1 and the plurality of second light sources S12 may be alternately disposed, and the angle θ4 formed by the extension lines of the first and second light sources S1 and S12 adjacent to each other may be about 22.5 degrees.

Figure 8A:
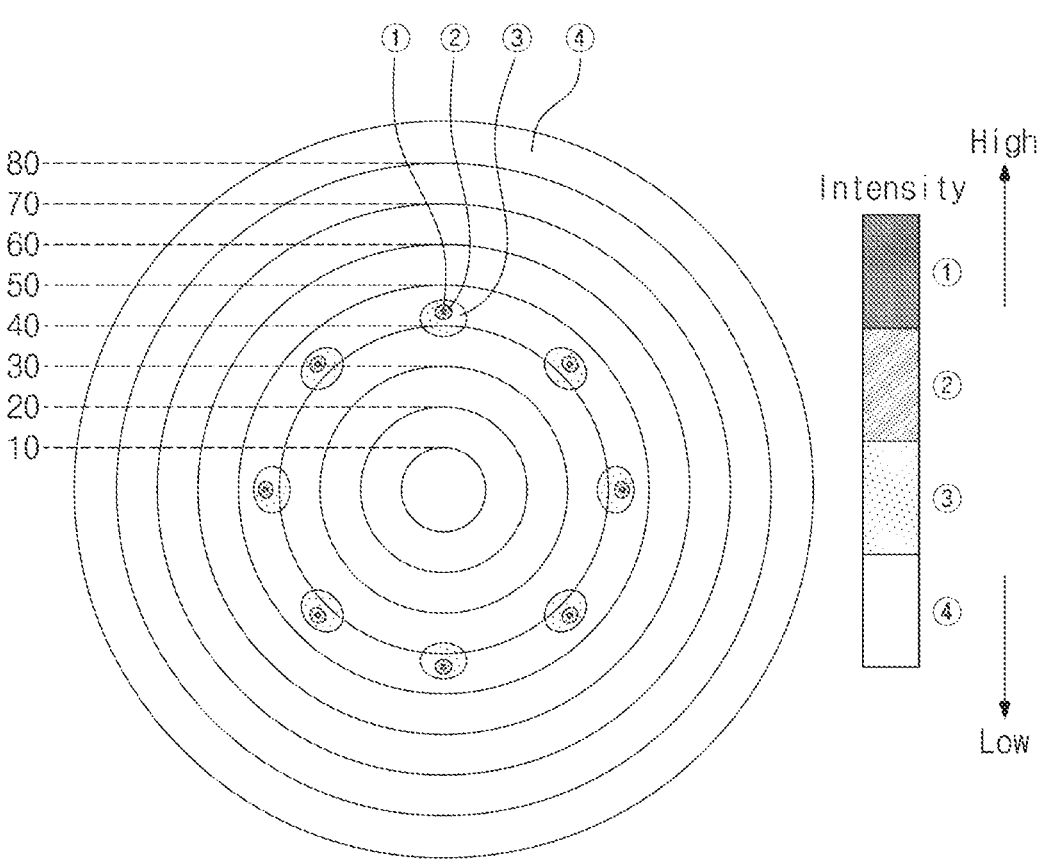
FIGS. 8A to 8C illustrate a dark field angle range when an intensity measured by the inspection apparatus according to an embodiment of the invention is greater than or equal to a predetermined intensity.
Figure 8B:
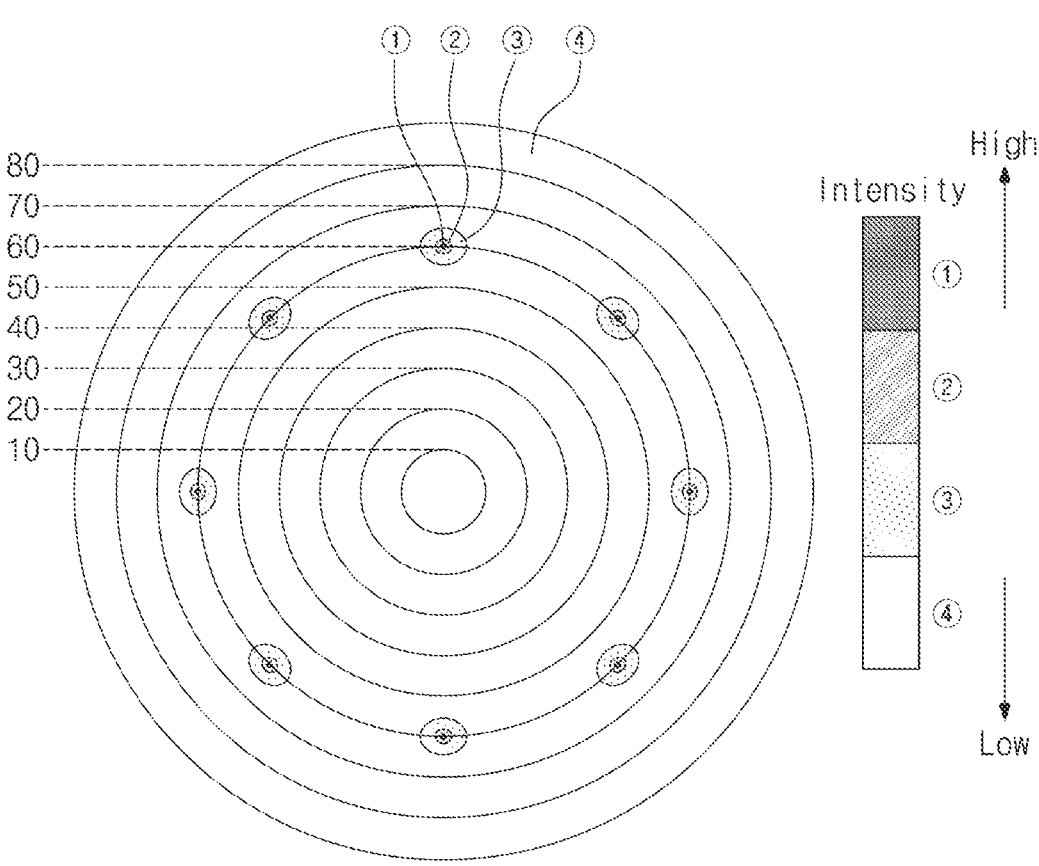
Figure 8C:
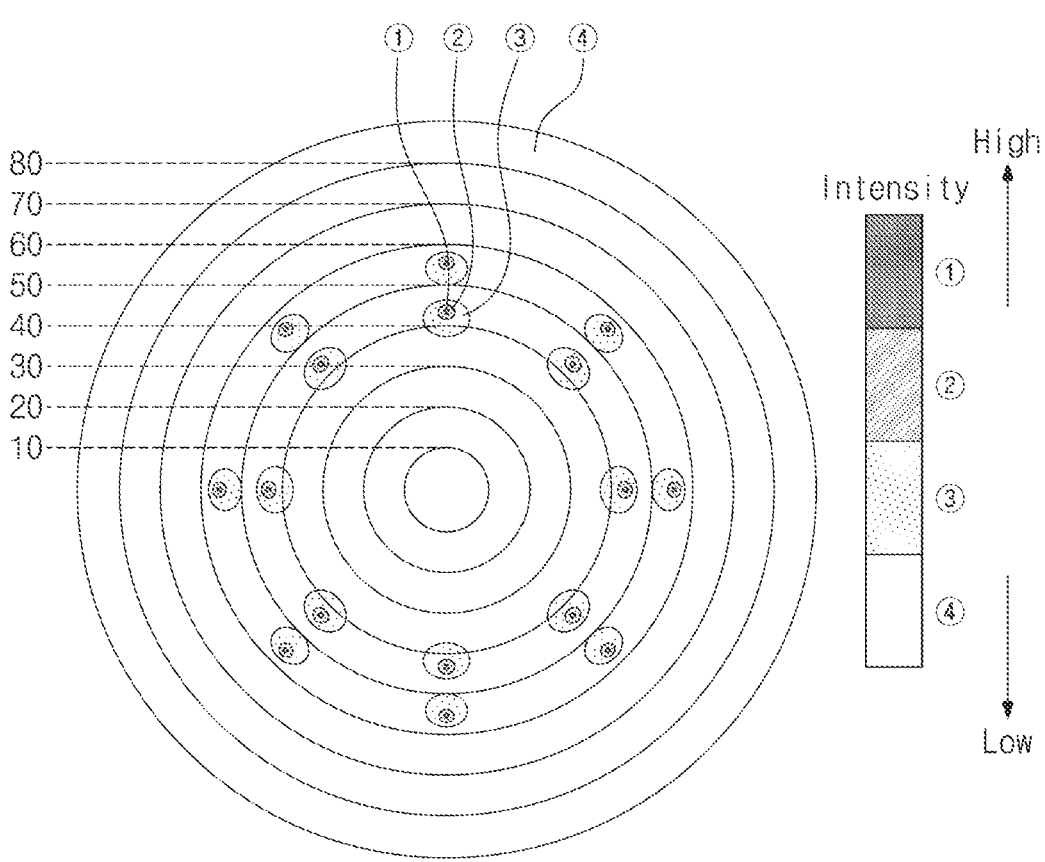

FIGS. 8A to 8C illustrate a dark field angle range when an intensity measured by the inspection apparatus according to an embodiment of the invention is greater than or equal to a predetermined intensity.

FIG. 8A illustrate a dark field angle range in a state in which only the first light sources SI1 (see FIG. 7A) emit beams in an embodiment of the invention of FIG. 7A, FIG. 8B illustrates a dark field angle range in a state in which only the second light sources S12 (see FIG. 7A) emit beams in an embodiment of the invention of FIG. 7A, and FIG. 8C illustrates a dark field angle range in a state in which the first light sources SI1 (see FIG. 7A) and the second light sources S12 (see FIG. 7A) emit beams in an embodiment of the invention of FIG. 7A.

Referring to FIGS. 8A to 8C together, it can be confirmed that the dark field angle (or dark field angle range) is changed according to the positions of the light sources from which beams are emitted among the plurality of light sources SI1 and S12 (see FIG. 7A).

Referring to FIG. 8A, when the measured intensity is equal to or greater than a predetermined intensity, the dark field angle range is in a range of about 40 degrees to about 45 degrees. Referring to FIG. 8B, when the measured intensity is equal to or greater than a predetermined intensity, the dark field angle range is in a range of about 58 degrees to about 62 degrees. Referring to FIG. 8C, when the measured intensity is equal to or greater than a predetermined intensity, the dark field angle range may be in a range of about 40 degrees to about 45 degrees, or in a range of about 50 degrees to about 55 degrees.

As illustrated in FIGS. 8A, 8B, and 8C, the dark field angle range may be shifted depending on whether or not beams are emitted only from the first light sources SI1 (see FIG. 7A) among the plurality of light sources SI1 and S12 (see FIG. 7A), whether or not beams are emitted only from the second light sources S12 (see FIG. 7A) among the plurality of light sources SI1 and S12 (see FIG. 7A), or whether or not beams are emitted from both the first light sources SI1 (see FIG. 7A) and the second light sources S12 (see FIG. 7A).

In an embodiment, as described above, the dark field angle (or dark field angle range) may vary according to the paths of beams emitted from the plurality of light sources SI1 and S12 (see FIG. 7A). In an embodiment, for example, the dark field angle (or dark field angle range) may vary depending on whether beams are emitted from the first light sources SI1 (see FIG. 7A) among the plurality of light sources SI1 and S12 (see FIG. 7A), or whether beams are emitted from the second light sources S12 among the plurality of light sources SI1 and S12 (see FIG. 7A).

A predetermined region that can be inspected by the inspection apparatus among the inspection object may be represented by the dark field angle (or dark field angle range) which may vary according to the paths of beams emitted from the plurality of light sources SI1 and S12 (see FIG. 7A). In order to set the dark field angle (or dark field angle range) so that the measured intensity is greater than or equal to a predetermined intensity in a predetermined region to be inspected to check whether a defect is in the inspection object, as described above, the paths of beams emitted from the plurality of light sources S1/ and S12 (see FIG. 7A) may be changed.

Figure 9A:
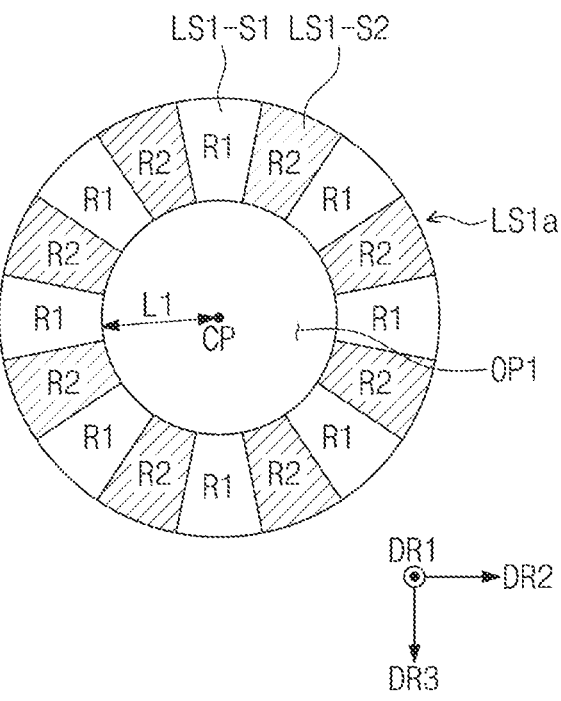
FIGS. 9A and 9B are plan views of a first lens according to an embodiment of the invention.
Figure 9B:
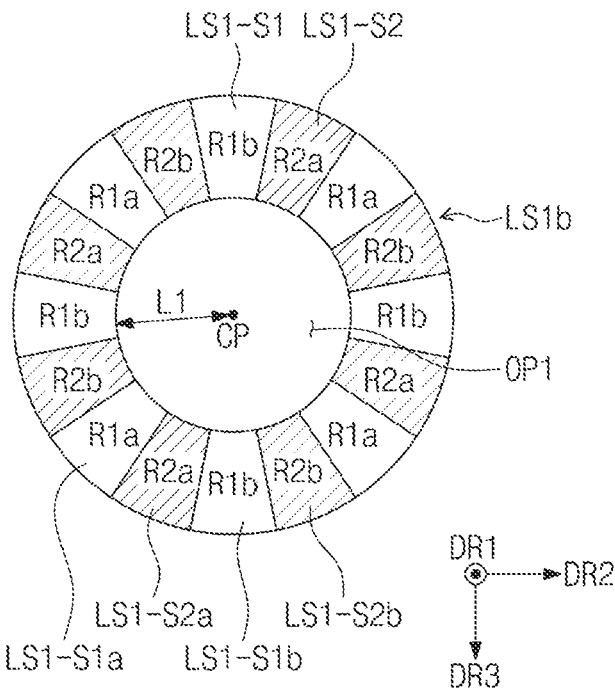

FIGS. 9A and 9B are plan views of first lenses LS1a and LS1b according to an embodiment of the invention.

Referring to FIG. 9A, in an embodiment, the first lens LS1a may include a plurality of sub-lenses LS1-S1 and LS1-S2. The first lens LS1a may include first sub-lenses LS1-S1 disposed along the periphery of the first opening OP1 and second sub-lenses LS1-S2 disposed along the periphery of the first opening OP1.

According to an embodiment of the invention, the first sub-lenses LS1-S1 and the second sub-lenses LS1-S2 may be alternately disposed along the periphery of the first opening OP1. Without being limited thereto, the first sub-lenses LS1-S1 and the second sub-lenses LS1-S2 may be disposed along the periphery of the first opening OP1 by various arrangements (or rules).

Each of the first sub-lenses LS1-S1 may have a first radius of curvature R1, and each of the second sub-lenses LS1-S2 may have a second radius of curvature R2. According to an embodiment of the invention, the first radius of curvature R1 may be different from the second radius of curvature R2, but the embodiment of the invention is not limited thereto, and the first radius of curvature R1 may be equal to the second radius of curvature R2.

Referring to FIG. 9B, in an embodiment, a first lens LS1b may include a plurality of first sub-lenses LS1-S1 and a plurality of second sub-lenses LS1-S2. The first sub-lenses LS1-S1 may include a plurality of first first sub-lenses LS1-S1a and a plurality of second first sub-lenses LS1-S1b. The second sub-lenses LS1-S2 may include a plurality of first second sub-lenses LS1-S2a and a plurality of second second sub-lenses LS1-S2b.

The plurality of first first sub-lenses LS1-S1a and the plurality of second first sub-lenses LS1-S1b may be alternately disposed along the periphery of the first opening OP1, and without being limited thereto, the plurality of first first sub-lenses LS1-S1a and the plurality of second first sub-lenses LS1-S1b may be disposed along the periphery of the first opening OP1 by various arrangements. The radius of curvature of the first first sub-lenses LS1-S1a and the radius of curvature of the second first sub-lenses LS1-S1b may be different from each other. The same applies to the plurality of first second sub-lenses LS1-S2a and the plurality of second second sub-lenses LS1-S2b.

The first lenses LS1a and LS1b according to an embodiment of the invention of FIGS. 9A and 9B may rotate about an axis in the first direction DR1. The first lenses LS1a and LS1b may be rotated by the aforementioned driving unit DU (see FIG. 4B). Positions of the first sub-lenses LS1-S1 and the second sub-lenses LS1-S2 may be changed according to the rotation of the first lenses LS1a and LS1b.

Figure 10A:
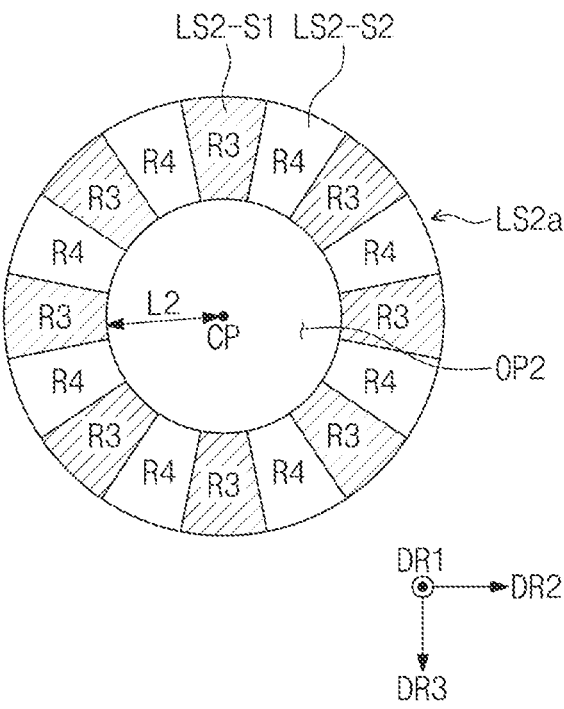
FIGS. 10A and 10B are plan views of a second lens according to an embodiment of the invention.
Figure 10B:
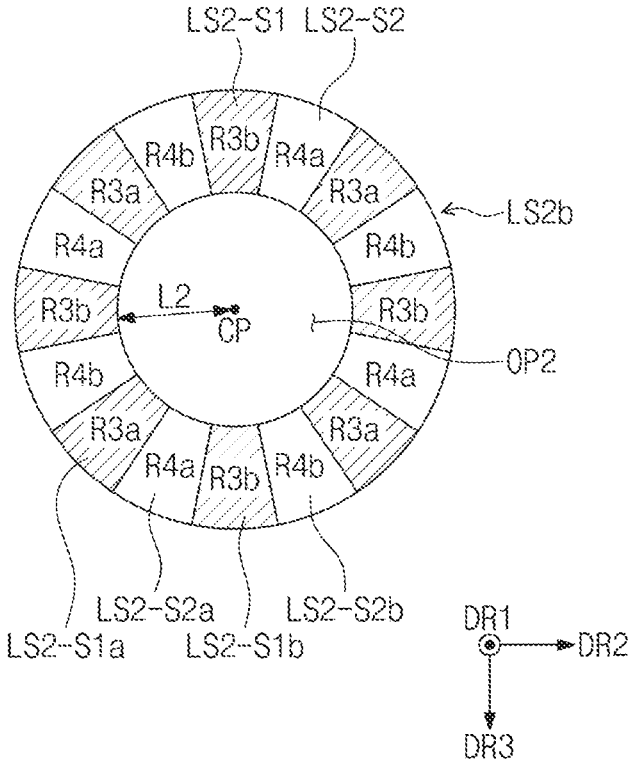

FIGS. 10A and 10B are plan views of a second lens according to an embodiment of the invention.

Referring to FIG. 10A, in an embodiment, a second lens LS2a may include a plurality of sub-lenses LS2-S1 and LS2-S2. The second lens LS2a may include first sub-lenses LS2-S1 disposed along the periphery of the second opening OP2 and second sub-lenses LS2-S2 disposed along the periphery of the second opening OP2.

According to an embodiment of the invention, the first sub-lenses LS2-S1 and the second sub-lenses LS2-S2 may be alternately disposed along the periphery of the second opening OP2, and without being limited thereto, the first sub-lenses LS2-S1 and the second sub-lenses LS2-S2 may be disposed along the periphery of the second opening OP2 by various arrangements.

Each of the first sub-lenses LS2-S1 may have a first radius of curvature R3, and each of the second sub-lenses LS2-S2 may have a second radius of curvature R4. According to an embodiment of the invention, the first radius of curvature R3 may be different from the second radius of curvature R4, but the embodiment of the invention is not limited thereto, and the first radius of curvature R3 may be equal to the second radius of curvature R4.

Referring to FIG. 10B, in an embodiment, the second lens LS2b may include a plurality of sub-lenses LS2-S1 and LS2-S2. First sub-lenses LS2-S1 may include a plurality of first first sub-lenses LS2-S1a and a plurality of second first sub-lenses LS2-S1b. A plurality of second sub-lenses LS2-S2 may include a plurality of first second sub-lenses LS2-S2a and a plurality of second second sub-lenses LS2-S2b.

The plurality of first first sub-lenses LS2-S1a and the plurality of second first sub-lenses LS2-S1b may be alternately disposed along the periphery of the first opening, but without being limited thereto, the plurality of first first sub-lenses LS2-S1a and the plurality of second first sub-lenses LS2-S1b may be disposed along the periphery of the first opening by various arrangements. The radius of curvature of the first first sub-lenses LS2-S1*a* may be different from the radius of curvature of the second first sub-lenses LS2-S1*b*. The same applies to the plurality of first second sub-lenses LS2-S2*a* and the plurality of second second sub-lenses LS2-S2*b*.

The second lenses LS2*a* and LS2*b* according to an embodiment of the invention of FIGS. 10A and 10B may rotate about the first direction DR1. The second lenses LS2*a* and LS2*b* may be rotated by the aforementioned driving unit DU (see FIG. 4B). Positions of the first sub-lens LS2-S1 and the second sub-lens LS2-S2 may be changed according to the rotation of the second lenses LS2*a* and LS2*b*.

Figure 11A:
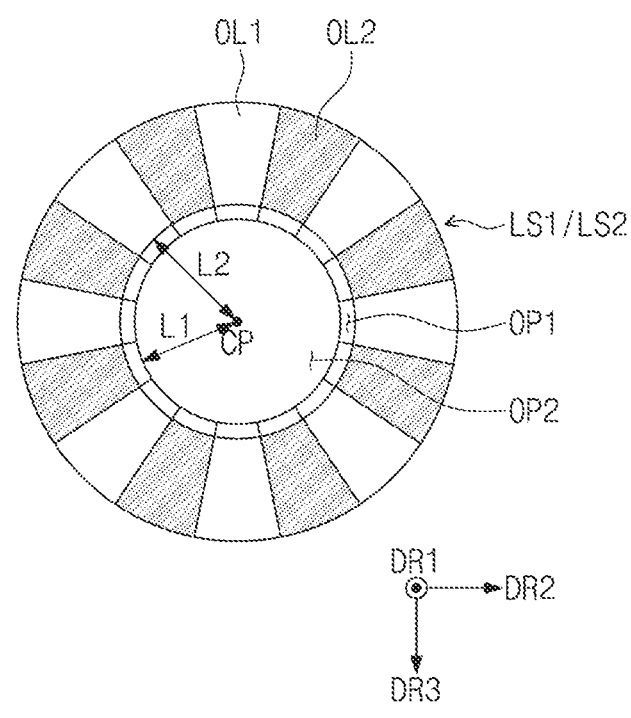
FIG. 11A is a plan view illustrating a state in which the first lens and the second lens overlap each other according to an embodiment of the invention.
Figure 11B:
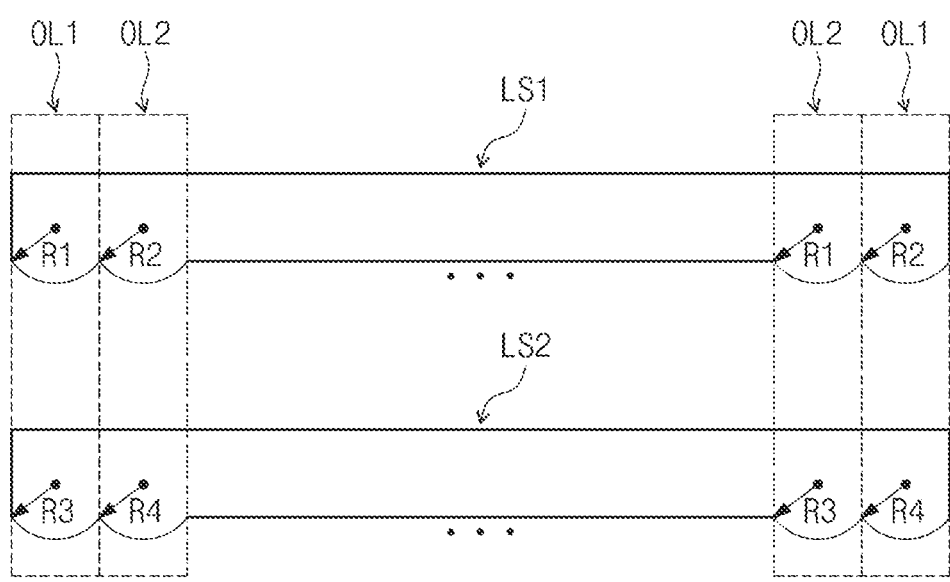
FIG. 11B is a cross-sectional view illustrating a state in which the first lens and the second lens overlap each other according to an embodiment of the invention.

FIG. 11A is a plan view illustrating a state in which the first lens and the second lens overlap each other according to an embodiment of the invention, and FIG. 11B is a cross-sectional view illustrating a state in which the first lens and the second lens overlap each other according to an embodiment of the invention.

With respect to the first lens LS1*a* of FIG. 9A and the second lens LS2*a* of FIG. 10A, FIG. 11A illustrates a state in which a first lens LS1 and a second lens LS2 overlap each other when viewed from above the first lens LS1 or when viewed in the first direction DR1.

Referring to FIG. 11A, according to an embodiment of the invention, a first overlapping portion OL1 represents a state in which a first sub-lens of the first lens LS1 and one of a first sub-lens and a second sub-lens of the second lens LS2 overlap each other, and a second overlapping portion OL2 represents a state in which a second sub-lens of the first lens LS1 and the other one of the first sub-lens and the second sub-lens of the second lens LS2 overlap each other.

In an embodiment, for example, the first overlapping portion OL1 may represent a state in which the first sub-lens of the first lens LS1 and a first sub-lens of the second lens LS2 overlap each other, and the second overlapping portion OL2 may represent a state in which the second sub-lens of the first lens LS1 and the second sub-lens of the second lens LS2 overlap each other.

Without being limited thereto, however, the first overlapping portion OL1 may represent a state in which the second sub-lens of the first lens LS1 and any one of a first sub-lens or a second sub-lens of the second lens LS2 overlap each other, and the second overlapping portion OL2 may represent a state in which the first sub-lens of the first lens LS1 and the other one of the first sub-lens or the second sub-lens of the second lens LS2 overlap each other.

In such an embodiment, the first sub-lens of the first lens LS1 overlaps one of the first sub-lens and the second sub-lens of the second lens LS2, and when the first sub-lens of the first lens LS1 overlaps the one of the first sub-lens and the second sub-lens of the second lens LS2, the first sub-lens of the first lens LS1 does not overlap the other of the first sub-lens and the second sub-lens of the second lens LS2. The same applies to the second sub-lens of the first lens LS1.

FIG. 11B is a cross-sectional view of a first overlapping portion OL1 and a second overlapping portion OL2 according to an embodiment of the invention. The first overlapping portion OL1 represents a state in which the first sub-lens LS1-S1 (see FIG. 9A) of the first lens LS1 and the first sub-lens LS2-S1 (see FIG. 10A) of the second lens LS2 overlap each other, and the second overlapping portion OL2 represents a state in which the second sub-lens LS1-S2 (see FIG. 9A) of the first lens LS1 and the second sub-lens LS2-S2 (see FIG. 10A) of the second lens LS2 overlap each other.

The radius of curvature R1 of the first sub-lens LS1-S1 (see FIG. 9A) of the first lens LS1 and the radius of curvature R3 of the second sub-lens LS2-S2 (see FIG. 10A) of the second lens LS2 may be different from each other, and the radius of curvature R2 of the second sub-lens LS1-S2 (see FIG. 9A) of the first lens LS1 and the radius of curvature R4 of the second sub-lens LS2-S2 (see FIG. 10A) of the second lens LS2 may be different from each other.

In such an embodiment, according to the rotation of the first lens LS1 or the second lens LS2 about the first direction DR1, the first sub-lens LS1-S1 (see FIG. 9A) of the first lens LS1 and the second sub-lens LS2-S2 (see FIG. 10A) of the second lens LS2 may overlap each other. The same also applies to the second sub-lens LS1-S2 (see FIG. 9A) of the first lens LS1.

Figure 12A:
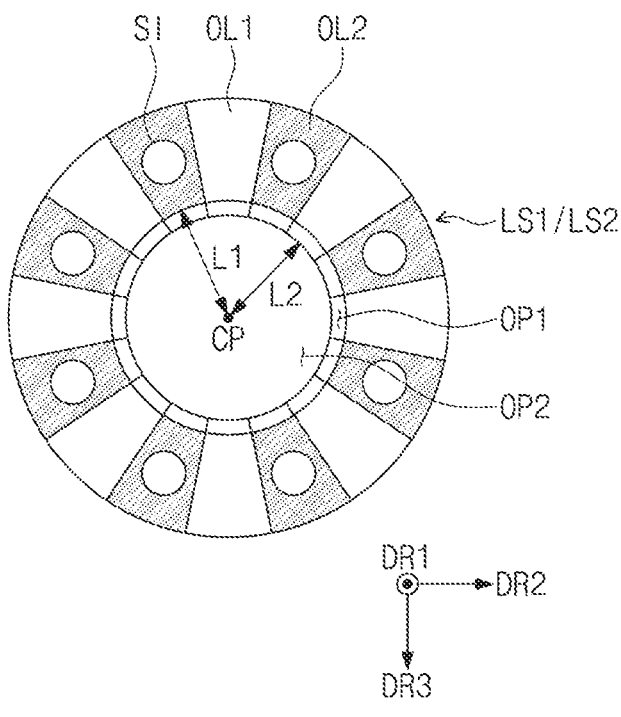
FIGS. 12A and 12B are plan views illustrating a state in which light sources, a first lens, and a second lens overlap each other according to an embodiment of the invention.
Figure 12B:
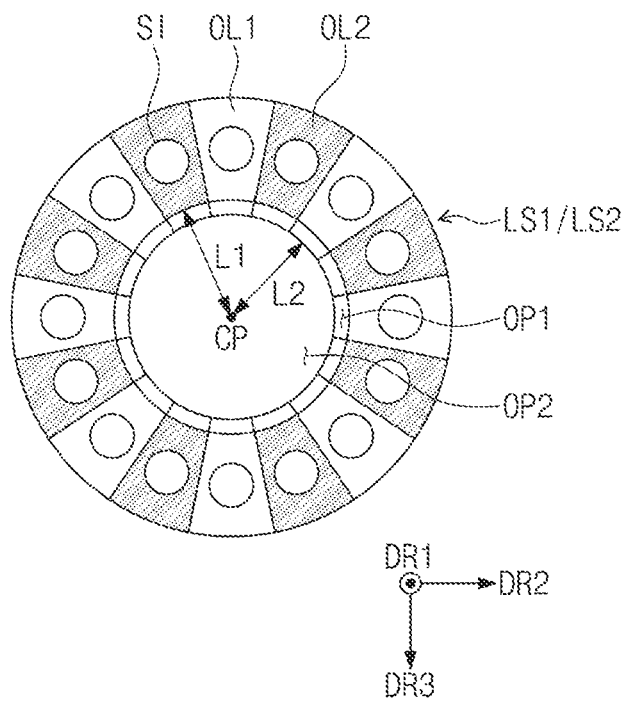

FIGS. 12A and 12B are plan views illustrating a state in which light sources, a first lens, and a second lens overlap each other according to an embodiment of the invention.

Specifically, FIG. 12A illustrates a state in which light sources S1 are disposed in the second overlapping portion OL2 according to an embodiment of the invention of FIG. 11A, and FIG. 12B illustrates a state in which light sources S1 are disposed in the first overlapping portion OL1 and the second overlapping portion OL2 according to an embodiment of the invention of FIG. 11A.

Referring to FIGS. 12A and 12B, according to an embodiment of the invention, each of the light sources S1 is disposed in the first overlapping portion OL1 or the second overlapping portion OL2, and one light source S1 is not disposed to overlap both the first overlapping portion OL1 and the second overlapping portion OL2 at the same time.

In such an embodiment, by allowing only one overlapping portion OL1 or OL2 and one light source S1 to overlap each other, it is possible to adjust the dark field angle more precisely, thereby improving inspection quality.

Figure 13A:
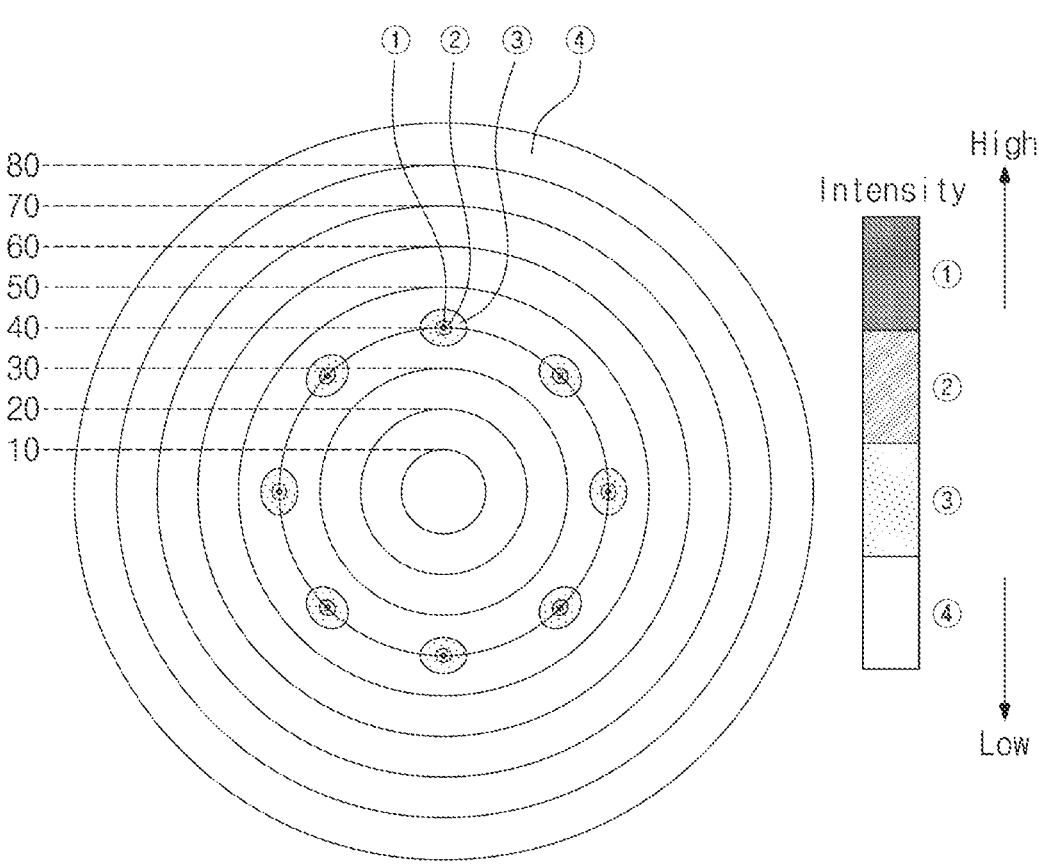
FIGS. 13A and 13B illustrate a dark field angle range when an intensity measured by the inspection apparatus according to an embodiment of the invention is greater than or equal to a predetermined intensity.
Figure 13B:
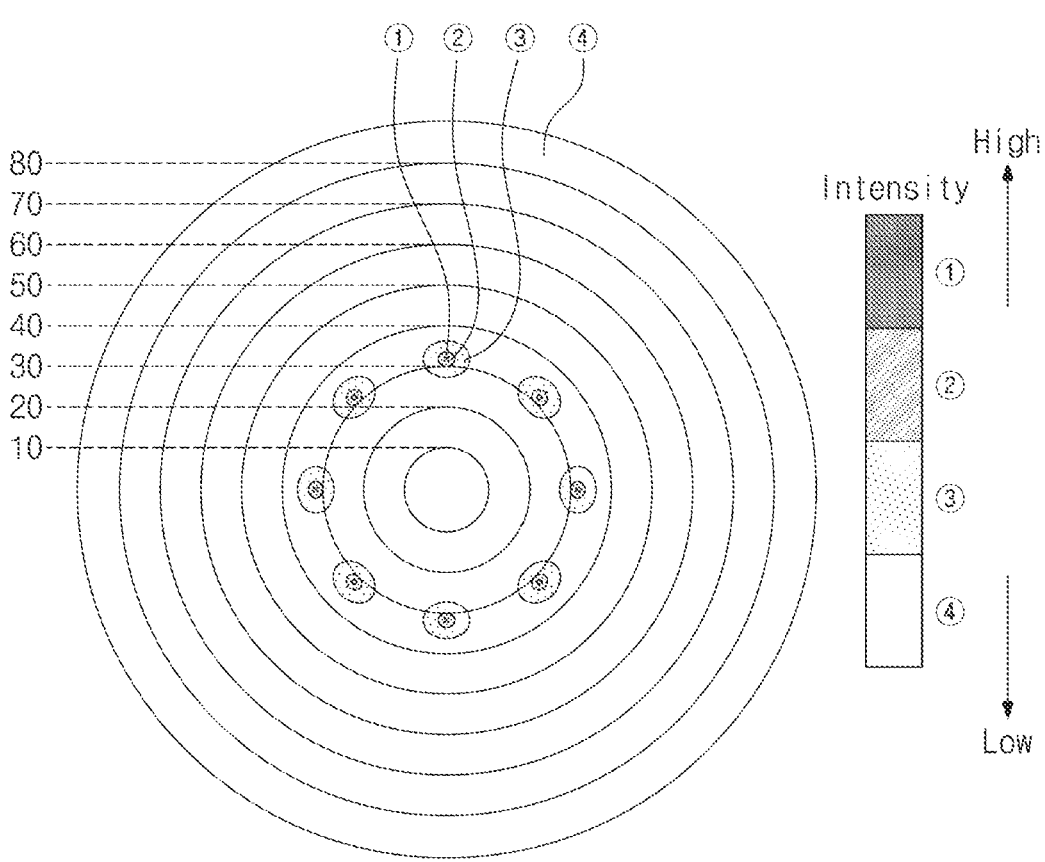

FIGS. 13A and 13B illustrate a change in dark field angle according to the rotation of a first lens or a second lens according to an embodiment of the invention.

FIG. 13A illustrates a dark field angle range in a state in which the first sub-lens of the first lens LS1 (see FIG. 12A) and the first sub-lens of the second lens LS2 (see FIG. 12A) overlap each other in an embodiment of the invention of FIGS. 11A and 11B, and FIG. 13B illustrates a dark field angle range in a state in which the first sub-lens of the first lens LS1 (see FIG. 12A) and the second sub-lens of the second lens LS2 (see FIG. 12A) overlap each other in an embodiment of the invention of FIG. 11.

FIGS. 13A and 13B illustrate a case where a dark field angle range according to a change in the sub-lenses overlapping each other between the first overlapping portion OL1 (see FIG. 12A) and the second overlapping portion OL2 (see FIG. 12A) according to the rotation of at least one of the first lens LS1 (see FIG. 12A) or the second lens LS2 (see FIG. 12A).

Referring to FIGS. 13A and 13B together, it can be confirmed that the dark field angle (or dark field angle range) is changed depending on whether the first sub-lens of the first lens LS1 (see FIG. 12A) and the first sub-lens of the second lens LS2 (see FIG. 12A) overlap each other or whether the first sub-lens of the first lens LS1 (see FIG. 12A) and the second sub-lens of the second lens LS2 (see FIG. 12A) overlap each other.

In addition, in this case, the first sub-lens of the first lens LS1 (see FIG. 12A) may be a concave lens and the first radius of curvature may be about −110 millimeters (mm), and the second sub-lens of the first lens LS1 (see FIG. 12A) may be a convex lens and the second radius of curvature may be about +150 mm. The first sub-lens of the second lens LS2 (see FIG. 12A) may be a convex lens and have a radius of curvature of about +38 mm, and the second sub-lens thereof may be a concave lens and have a radius of curvature of about −150 mm.

Referring to FIG. 13A, when the measured intensity is equal to or greater than a predetermined intensity, the dark field angle range is in a range of about 38 degrees to about 42 degrees. Referring to FIG. 13B, when the measured intensity is equal to or greater than a predetermined intensity, the dark field angle range is in a range of about 30 degrees to about 35 degrees.

As illustrated in FIGS. 13A and 13B, the dark field angle range may be shifted according to which lens overlaps the first sub-lens of the first lens LS1 (see FIG. 12A).

As described above, the dark field angle (or dark field angle range) may vary depending on the overlapping relationship between the sub-lenses of the first lens LS1 (see FIG. 12A) and the sub-lenses of the second lens LS2 (see FIG. 12A).

A predetermined region that can be inspected by the inspection apparatus among the inspection object may be represented by the dark field angle (or dark field angle range) that may vary according to the paths of beams emitted from a plurality of light sources. In order to set the dark field angle (or dark field angle range) so that the measured intensity is greater than or equal to a predetermined intensity in a predetermined region to be inspected to check whether a defect is present in the inspection object, as described above, the overlapping relationship between the sub-lenses of the first lens LS1 (see FIG. 12A) and the sub-lenses of the second lens LS2 (see FIG. 12A) may be changed.

The inspection apparatus according to an embodiment of the invention may have improved reliability of defect determination.

The inspection apparatus according to an embodiment of the invention may have improved visibility of defects in the inspection object.

The inspection apparatus according to an embodiment of the invention may easily change the dark field angle while maintaining a light condensing position.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An inspection apparatus comprising:
a light source disposed to be spaced apart from an inspection object in a first direction, wherein the light source radiates a beam;
a first lens disposed between the inspection object and the light source, wherein the first lens is provided with a first opening defined therethrough in the first direction;
a second lens disposed between the inspection object and the first lens, wherein the second lens is provided with a second opening defined therethrough in the first direction to overlap the first opening;
an inspection unit disposed to be spaced apart from the inspection object with the first lens interposed therebetween, wherein the inspection unit comprises an incidence portion disposed to overlap the first opening and the second opening on a plane; and a driving unit which adjusts a first distance between the first lens and the inspection object or a second distance between the second lens and the inspection object.

2. The inspection apparatus of claim 1, wherein at least one selected from the first lens and the second lens comprises a convex lens.

3. The inspection apparatus of claim 1, wherein at least one selected from the first lens and the second lens comprises an aspherical lens.

4. The inspection apparatus of claim 1, wherein at least one selected from the first lens and the second lens comprises a Fresnel lens.

5. The inspection apparatus of claim 1, wherein at least one selected from the first lens and the second lens comprises:
a plurality of first sub-lenses disposed along a periphery of the first opening or the second opening and each having a first radius of curvature; and
a plurality of second sub-lenses disposed alternately with the plurality of first sub-lenses along a periphery of the first opening or the second opening and each having a second radius of curvature.

6. The inspection apparatus of claim 1, wherein a radius of the first opening is smaller than or equal to a radius of the second opening.

7. The inspection apparatus of claim 1, wherein:
the light source is provided in plurality; and
a plurality of light sources comprises a plurality of first light sources arranged to be spaced apart from a center of the first opening by a first separation distance and a plurality of second light sources arranged to be spaced apart from the center of the first opening by a second separation distance,
wherein the first separation distance and the second separation distance are greater than a radius of the first opening.

8. The inspection apparatus of claim 7, wherein:
the first separation distance and the second separation distance are the same as each other; and
the first light sources and the second light sources are alternately arranged with each other.

9. The inspection apparatus of claim 7, wherein the second separation distance is greater than the first separation distance.

10. The inspection apparatus of claim 7, wherein the first light sources and the second light sources are disposed to be aligned with each other when viewed from the center of the first opening.

11. The inspection apparatus of claim 8, further comprising:
a control unit which controls an operation of the plurality of light sources,
wherein the control unit adjusts an emission angle of the beam or control a switch-on or switch-off operation of the plurality of light sources.

12. An inspection apparatus comprising:
a light source disposed to be spaced apart from an inspection object in a first direction, wherein the light source radiates a beam;
a first lens disposed between the inspection object and the light source, wherein the first lens is provided with a first opening defined therethrough in the first direction;
a second lens disposed between the inspection object and the first lens, wherein the second lens is provided with a second opening defined therethrough in the first direction to overlap the first opening; and an inspection unit disposed to be spaced apart from the inspection object with the first lens interposed therebetween, wherein the inspection unit comprises an incidence portion disposed to overlap the first opening and the second opening on a plane, wherein at least one selected from the first lens and the second lens comprises:

a plurality of first sub-lenses disposed along a periphery of the first opening or the second opening and each having a first radius of curvature; and a plurality of second sub-lenses disposed alternately with the first sub-lenses along the periphery of the first opening or the second opening and each having a second radius of curvature.

13. The inspection apparatus of claim 12, wherein:

the first sub-lenses of the first lens overlap the first sub-lenses of the second lens of the second lens, and the second sub-lenses of the first lens overlap the second sub-lenses of the second lens; or the first sub-lenses of the first lens overlap the second sub-lenses of the second lens of the second lens, and the second sub-lenses of the first lens overlap the first sub-lenses of the second lens.

14. The inspection apparatus of claim 12, wherein the first radius of curvature and the second radius of curvature are different from each other.

15. The inspection apparatus of claim 12, wherein:

the light source is provided in plurality; and a plurality of light sources overlap one of the first sub-lenses or the second sub-lenses.

16. The inspection apparatus of claim 12, wherein a radius of the first opening is smaller than or equal to a radius of the second opening.

17. The inspection apparatus of claim 12, further comprising:

a driving unit which rotates at least one selected from the first lens and the second lens around an axis in the first direction.

18. The inspection apparatus of claim 17, wherein the driving unit adjusts a first distance between the first lens and the inspection object or a second distance between the second lens and the inspection object.

19. The inspection apparatus of claim 12, wherein:

the light source is provided in plurality; and a plurality of light sources comprises a plurality of first light sources arranged to be spaced apart from a center of the first opening by a first separation distance and a plurality of second light sources arranged to be spaced apart from the center of the first opening by a second separation distance, wherein the first separation distance and the second separation distance are greater than a radius of the first opening.

20. The inspection apparatus of claim 19, wherein the first light sources and the second light sources are disposed to be aligned with each other when viewed from the center of the first opening.

* * * * *